United States Patent [19]
Kawakami

[11] Patent Number: 5,853,914
[45] Date of Patent: *Dec. 29, 1998

[54] RECHARGEABLE LITHIUM BATTERY HAVING A SPECIFIC PRESSURE MEANS COMPRISING A POLYMER GEL MATERIAL

[75] Inventor: Soichiro Kawakami, Nara, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 709,448

[22] Filed: Sep. 6, 1996

[30] Foreign Application Priority Data

Sep. 6, 1995 [JP] Japan .................................. 7-252068

[51] Int. Cl.$^6$ ........................................................ H01M 2/10
[52] U.S. Cl. ............................ 429/66; 429/142; 429/186
[58] Field of Search ............................ 429/66, 186, 190, 429/142

[56] References Cited

U.S. PATENT DOCUMENTS

| | | | |
|---|---|---|---|
| 2,499,239 | 2/1950 | Williams | 429/66 |
| 2,723,301 | 11/1955 | West et al. | 429/190 |
| 5,244,754 | 9/1993 | Bohmer et al. | 429/66 X |
| 5,605,549 | 2/1997 | Zucker | 429/190 X |

OTHER PUBLICATIONS

Journal of the Electrochemical Society, "The Electrochemnical Decomposition of Propylene Carbonate on Graphite," Dey, et al., vol. 117, No. 2, pp. 222–224, Feb. 1970.

Primary Examiner—Stephen Kalafut
Attorney, Agent, or Firm—Fitzpatrick, Cella, Harper & Scinto

[57] ABSTRACT

A rechargeable lithium battery comprising at least a cathode, a separator, an anode, and an electrolyte or electrolyte solution integrated in a battery housing, characterized in that said rechargeable lithium battery is provided with a pressure means comprising a polymer gel for pressing said anode and cathode.

29 Claims, 7 Drawing Sheets

RECHARGEABLE LITHIUM BATTERY HAVING A SPECIFIC PRESSURE MEANS COMPRISING A POLYMER GEL MATERIAL

BACKGROUND OF THE INVENTION

1. Field of the Invention

The present invention relates to a highly reliable rechargeable lithium battery using intercalation and deintercalation reactions of lithium ions in charging and discharging.

The rechargeable lithium battery using intercalation and deintercalation reactions of lithium ions in charging and discharging will be hereinafter simply referred to as rechargeable lithium battery. And the rechargeable lithium battery in the present invention is meant to include a lithium ion battery.

More particularly, the present invention relates to an improved, highly reliable rechargeable lithium battery provided with a specific pressure means comprising a polymer gel material for pressing the anode and the cathode arranged therein, which is low in internal impedance, and has an improved charge-and-discharge efficiency and a prolonged charging and discharging cycle life.

2. Related Background Art

In recent years, global warming from the so-called greenhouse effect has been predicted due to increased level of atmospheric $CO_2$. To prevent this warming phenomenon from further developing, there is a tendency to prohibit the construction of new steam-power generation plants which exhaust a large quantity of $CO_2$.

Under these circumstances, proposals have been made to institute load leveling in order to effectively utilize power. Load leveling involves the installation of rechargeable batteries at general locations to serve a storage for surplus power unused in the night, known as dump power. The power thus stored is available in the day time when the power demand is increased, leveling the load requirements in terms of power generation.

Separately, there is an increased societal demand for developing a high performance rechargeable battery with a high energy density for an electric vehicle which would not exhaust air polluting substances. There is further increased societal demand for developing a miniature, lightweight, high performance rechargeable battery usable as a power source for portable instruments such as small personal computers, word processors, video cameras, and pocket telephones.

In order to attain such a miniature and light weight rechargeable battery, various studies have been made of a rechargeable lithium battery which would allow the application of a high voltage and which would excel in energy density. For instance, a lithium-graphite intercalation compound as an anode active material in a rechargeable battery has been proposed (see, *Journal of the Electrochemical Society*, 117, 222, (1970)).

Since then, public attention has focused on a rocking chair type lithium ion battery. And various studies have been made in order to develop such a rocking chair type lithium ion battery. The rocking chair type lithium ion battery is typically configured such that a carbonous intercalation material is used as an anode active material and another intercalation compound intercalated with lithium ions is used as a cathode active material, and lithium ions are intercalated into the six-membered network layer planes provided by carbon atoms to store in the battery reaction upon charging. Presently, there are known several rocking chair type lithium ion batteries having such configuration, which are practically usable. In these lithium ion rechargeable batteries, the carbonous material serving as a host for allowing lithium ions as a guest to intercalate (or insert) into or deintercalate (or release) from the six-membered network layer planes of the carbonous material is used as the anode active material to prevent the growth of a lithium dendrite so that the charging and discharging cycle life is prolonged.

In the conventional rechargeable lithium batteries including these lithium ion batteries, since lithium deposited upon charging is readily reactive with moisture, there is generally used a nonaqueous solvent as the solvent for the electrolyte used. Particularly, in the case of a nonaquecus series electrolyte solution prepared by dissolving a given electrolyte in a nonaqueous solvent, its ion electrical conductivity is lower than that of an aqueous series electrolyte solution. Therefore, in the case of a rechargeable lithium battery in which such a nonaqueous series electrolyte solution is used, in order to reduce the battery impedance, the distance between the cathode and anode is narrowed by pressing the cathode and anode. Whether or not the electrode impedance can be reduced greatly influences the battery characteristics. If a desirable reduction in the electrode impedance should be attained, an improvement can be attained in not only the charge-and-discharge efficiency but also the charging and discharging cycle life. For instance, in the case of a spiral-wound rechargeable lithium battery comprising a stacked body (comprising an anode, a separator, and a cathode) wound in multiple on a predetermined axis, the distance between the anode and cathode can be easily narrowed by applying a desired tension in a spiral state upon winding the stacked body in multiple. However, in the case of a large rectangular prismatic rechargeable lithium battery produced by laminating a rectangular cathode and a rectangular anode, an appropriate pressure means capable of uniformly narrowing the distance between said rectangular cathode and anode is not available at the present time. Therefore, it is difficult to attain a practical employable large capacity rechargeable lithium battery which is high enough in charge-and-discharge efficiency and long enough in charging and discharging cycle life.

Separately, for the conventional lithium ion battery, there is a problem in that a lithium dendrite is often generated upon overcharging to cause internal-shorts between the anode and cathode, where a large electric current suddenly flows causing temperature rise in the battery whereby the organic solvent of the electrolyte solution is decomposed to increase the internal pressure of the battery. In order to prevent the occurrence of this problem, the use of a safety means is known. As such safety means, there is known to employ a separator comprising a polyethylene or polypropylene capable of fusing to fill micropores upon temperature rise. Besides this, it is known to install a PTC (positive temperature coefficient) element in the battery. Further, it is known to install a overcharge preventive circuit in the battery. The use of these safety means unavoidably makes the resulting lithium ion battery to be high in production cost.

Hence, there is an increased demand for simplifying the structure of, particularly, a rechargeable lithium battery having a large battery capacity especially in terms of the safety means.

SUMMARY OF THE INVENTION

A principal object of the present invention is to eliminate the foregoing problems found in the prior art and to provide a highly reliable rechargeable lithium battery which is free of such problems.

A further object of the present invention is to provide an improved, highly reliable rechargeable lithium battery particularly having a large capacity which is provided with a specific pressure means comprising a polymer gel material for pressing the anode and cathode and which has a high energy density and a prolonged charging and discharging cycle life.

A typical embodiment of a rechargeable lithium battery which attains the above objects of the present invention comprises at least an anode, a separator, a cathode, and an electrolyte (or an electrolyte solution) integrated in a battery housing, characterized in that the rechargeable lithium battery is provided with a specific pressure means comprising a polymer gel material for pressing the anode and cathode.

DESCRIPTION OF THE INVENTION AND PREFERRED EMBODIMENTS

Figure 1:
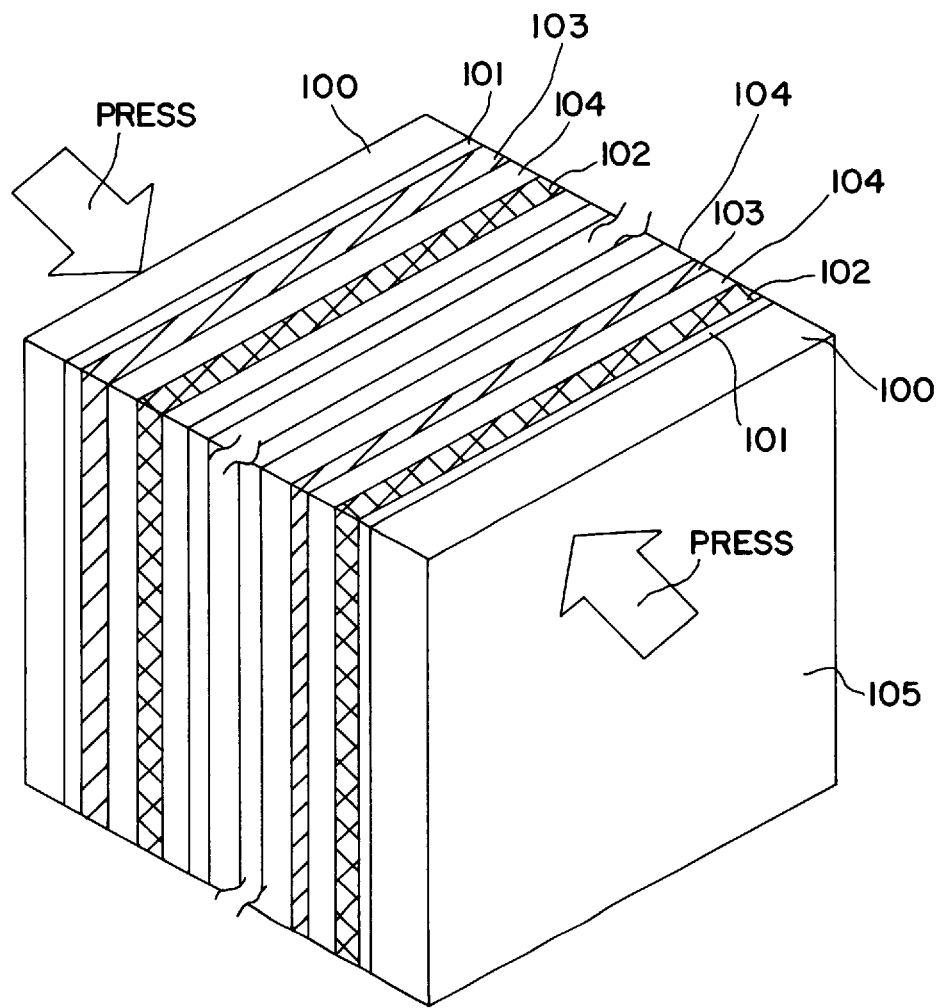
FIG. 1 is a schematic view illustrating an example of the constitution of a rechargeable lithium battery provided with pressure means comprising a polymer gel material according to the present invention.

As previously described, the present invention provides a highly reliable rechargeable lithium battery comprising at least an anode, a separator, a cathode and an electrolyte or electrolyte solution integrated in a battery housing, characterized in that said rechargeable lithium battery is provided with a specific pressure means comprising a polymer gel material for pressing the anode and cathode. The pressure means enables control of the distance between the anode and cathode as desired so as to attain a desirably adjusted internal impedance of the battery.

In a preferred embodiment, the pressure means for pressing the anode and cathode comprises a polymer gel material capable of being expanded or shrunk depending upon the concentration of a solvent. In this case, by adding an appropriate solvent into the polymer gel material of the pressure means disposed in a fabricated rechargeable lithium battery, uniform pressure can be attained between the anode and the cathode. This situation enables construction of a largesize rechargeable lithium battery. By this, there can be attained a large capacity rechargeable lithium battery having an increased charge-and-discharge efficiency, a prolonged charging and discharging cycle life, and a high energy density.

In the present invention, the separator itself interposed between the anode and the cathode may be designed to also exhibit a pressing performance for the anode and cathode by providing a layer comprising a polymer gel material capable of being expanded or shrunk depending upon the concentration of a solvent (this layer will be hereinafter referred to as polymer gel material layer) at the separator such that the separator is covered by the polymer gel material layer. In this case, when the electrolyte solution is also incorporated into the polymer gel material layer covering the separator, the polymer gel material layer is expanded or shrunk by virtue of the solvent contained in the electrolyte solution to attain a close relationship between the anode and the cathode through the separator having the electrolyte solution therein. As a result a desirable reduction in the internal impedance of the battery is attained and the electrolyte solution is immobilized in the polymer gel material layer to prevent the electrolyte solution from being decomposed particularly upon operating charging. Also, the generation of a lithium dendrite on the surface of the anode upon operating charging is effectively prevented. And if said lithium dendrite should be generated, the lithium dendrite is prevented from growing while preventing it from being separated. This situation prolongs the charging and discharging cycle life of the rechargeable lithium battery.

In the present invention, the polymer gel material capable of being expanded or shrunk depending upon the concentration of a solvent, which is used as the pressure means for the anode and cathode, may preferably comprise a polymer gel material excelling in rigidity which is prepared using a side chain-bearing monomer, or an ionic polymer gel material having a group capable of dissociating to convert into an ion in a solvent. Any of these polymer gel materials is advantageous in that it is discontinuously expanded and shrunk.

Further, in the present invention, the polymer gel material capable of being expanded or shrunk depending upon the concentration of a solvent, which is used as the pressure means for the anode and cathode, may preferably comprise a polymer gel material capable of being shrunk upon temperature rise. In this case, the pressure means performs such that it releases the pressure between the anode and the cathode upon temperature rise to increase the internal impedance of the battery thereby controlling the electric current flown in the battery. By this, the rechargeable lithium battery is always maintained in a safe state. Particularly, when the separator itself interposed between the anode and the cathode is constituted by at least a polymer gel material capable of being shrunk upon temperature rise so that it also exhibit a performance of releasing the pressure between the anode and the cathode upon temperature rise, there is provided an advantage in that when the temperature of the battery is raised due to internal-shorts or the like inside of the battery, the separator is shrunk to increase the internal impedance of the battery thereby preventing the electrolyte solution from being decomposed. Accordingly an improvement is attained in the safety of the rechargeable lithium battery. When the above polymer gel material capable of being shrunk upon temperature rise comprises a polymer gel material excelling in rigidity which is prepared using a side chain-bearing monomer, or an ionic polymer gel material having a group capable of dissociating to convert into an ion in a solvent, any of these polymer gel materials is readily shrunk upon temperature rise. Hence, it is desired to use any of these polymer gel materials as the pressure means which releases the pressure between the anode and cathode upon temperature rise.

In the present invention, the pressure means comprising the foregoing polymer gel material for pressing the anode and the cathode may be configured such that pressure means comprises a polymer gel material shaped into a sheet-like form (this will be hereinafter referred to as polymer gel sheet). In this case, there are provided advantages in that the volume occupied by the pressure means in the rechargeable lithium battery is minimized, and a uniform pressure is applied against the anode and the cathode.

In the case where the polymer gel sheet is of a configuration formed by subjecting a powdery polymer gel material to press-molding or by dispersing a polymer gel material on or in a support member, the size of the polymer gel sheet can uniformly controlled as desired upon the preparation thereof. The use of such a polymer gel sheet applies a uniform pressure against the anode and the cathode. This situation makes the rechargeable lithium battery have uniform battery characteristics.

The rechargeable lithium battery according to the present invention may be configured such that a plurality of laminates each comprising the anode, the separator (having the electrolyte solution retained therein) and the cathode are respectively housed in a heat-shrinkable tubing in a plurality of unit cells. The plurality of unit cells are stacked into a stacked body, and the stacked body is placed in the battery housing such that the stacked body is sandwiched between a pair of the pressure means comprising the foregoing polymer gel material in the battery housing. This configuration has advantages such that there is no occasion for the anode and the cathode to be stacked in a deviated state upon the fabrication of a rechargeable lithium battery, the stacked body can be readily inserted into the battery housing, and the rechargeable lithium battery has improved uniform battery characteristics. Further, in the case where an end portion of each of the above heat-shrinkable tubings, where the power outputting and inputting terminals of the anode and cathode are not present, is sealed, the electrolyte solution retained in the separator is not diffused into the polymer gel material of the pressure means. Because of this, the polymer gel material of the pressure means does not suffer from phase change of an influence due to a certain factor other than the temperature, where the pressure means desirably exhibit a pressing performance against the stacked body.

In the case where the polymer gel material as the pressure means in the present invention comprises a powdery polymer gel material, the powdery polymer gel material allows a solvent to readily penetrate thereinto thereby making phase change readily occur in the pressure means so that an improvement is provided in the expanding and shrinking efficiency of the pressure means. In this case, the powdery polymer gel material of the pressure means can be readily combined with other polymer material. This situation provides a polymer gel sheet having a thickness excelling in uniformity and which is expanded and shrunk in an improved uniform state. Hence, there can be attained a sheet-like shaped pressure means having an improved uniform thickness.

In the following, the present invention is further described while referring to FIGS. 1 to 3.

FIG. 1 is a conceptual view of a rechargeable lithium battery according to the present invention. The rechargeable lithium battery comprises a stacked body sandwiched between a pair of pressure means 100 each including a layer comprising the foregoing polymer gel material which is supported on a support member 101. The stacked body comprises a plurality of laminates each comprising at least an anode 102, a separator 104 having an electrolyte solution retained therein and a cathode 103. Reference numeral 105 indicates a battery housing (which is not expressly shown in the figure for simplification).

The pressure means herein uses a property of the polymer gel material at expanding depending upon the concentration of a solvent. By configuring the polymer material into a sheet (that is, the layer) on the support member 101 as shown in FIG. 1, after the above stacked body is inserted into the battery housing, the stacked body can readily be pressed from the opposite sides by the pair of the pressure means. According to the configuration of FIG. 1, the fabrication of a rechargeable lithium battery can be efficiently conducted and the stacked body can be uniformly pressed.

Figure 2:
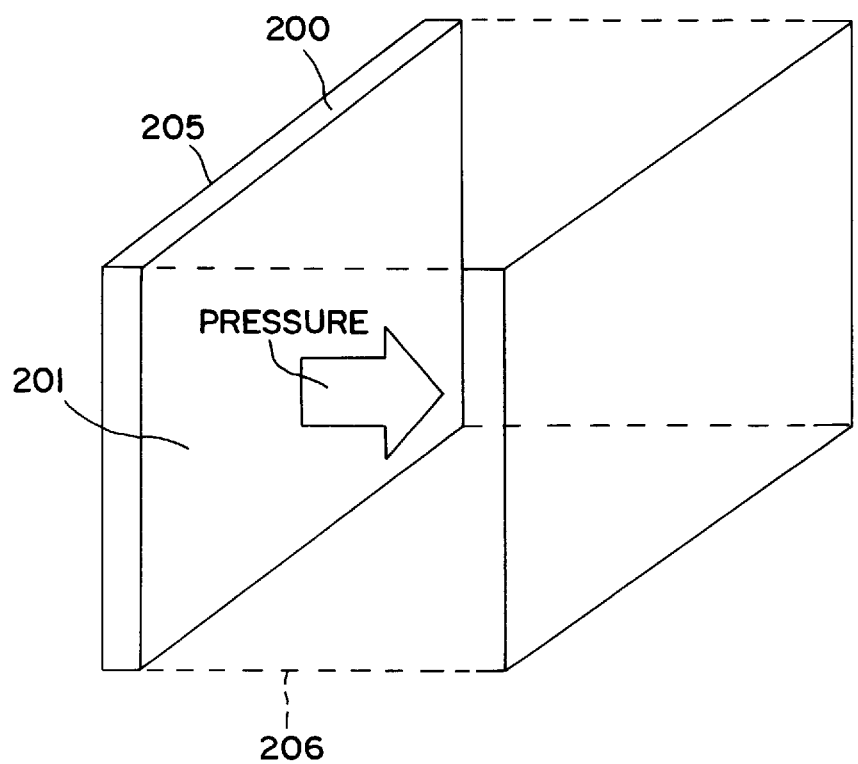
FIG. 2 is a schematic diagram illustrating the mechanism for a polymer gel material sheet as a pressure means used in a rechargeable lithium battery to exhibit pressing by way of swelling in the present invention.

FIG. 2 is a conceptual view for explaining an example of the mechanism for the pressure means 100 comprising the polymer gel material shown in FIG. 1 to exhibit a pressing performance by way of swelling the polymer gel material by virtue of a given solvent. In FIG. 2, reference numeral 200 indicates a polymer gel material sheet (corresponding to the polymer gel material layer as the pressure means 100 in FIG. 1), reference numeral 201 a support member (corresponding to the support member 101 in FIG. 1), reference numeral 205 a battery housing, and reference numeral 206 volume swell (or volume expansion). Now, as shown in FIG. 2, by adding a given solvent (capable of being adsorbed by the polymer gel material to swell the polymer gel material) into the polymer gel material sheet 200, the polymer gel material sheet is expanded in terms of the volume as indicated by the numeral reference 206 in FIG. 2. Therefore, by arranging the polymer gel material sheet 200 in the battery housing 205 such that it is in parallel to the side plane of the stacked body (see, FIG. 1, not shown in FIG. 2), a uniform pressure can applied against the respective anodes and cathodes of the stacked body, where the distance of each pair of the anode and cathode in the stacked body can be uniformly shortened to result in a reduction in the internal impedance of the battery. Herein, it is required for the polymer gel sheet to be designed such that it is expanded to cause a pressure in the direction perpendicular to the plane without causing a pressure in the direction parallel to the plane. In order to attain this, it is possible to employ a construction wherein the polymer gel material sheet is prepared by drying a given polymer gel material and press-molding the dried polymer gel material in the plane direction to be pressed or a construction wherein the size of the polymer gel material sheet is appropriately adjusted in advance while having a due care about the size thereof upon the volume expansion.

For the mechanism for the polymer gel sheet as the pressure means to be shrunk upon temperature rise to release the pressure between the anode and cathode, it can be easily understood from the description of FIG. 2.

FIGS. 3(A) to 3(D) are schematic views respectively illustrating a polymer gel material in the form of a film-like shape or sheet-like shape prior to swelling, which constitutes a principal part of the pressure means used in a rechargeable lithium battery according to the present invention.

Figure 3A:
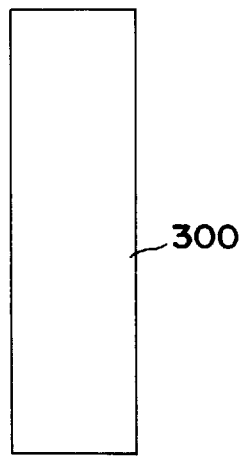
FIGS. 3(A) through 3(D) are schematic views respectively illustrating a polymer gel material in the form of a film-like shape or sheet-like shape which constitutes a principal part of a pressure means used in a rechargeable lithium battery in the present invention.

Particularly, FIG. 3(A) is a schematic view illustrating a pressure means comprising a polymer gel material 300 only.

Figure 3B:
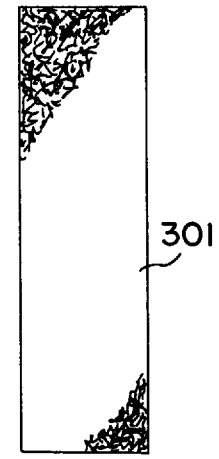
Figure 3C:
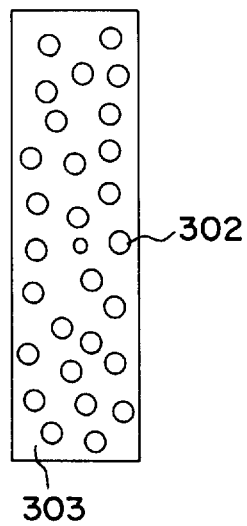
Figure 3D:
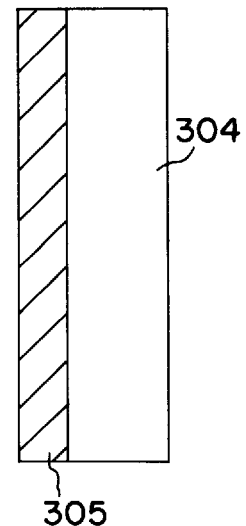

FIG. 3(B) is a schematic view illustrating a pressure means comprising a polymer gel material 301 implanted in a nonwoven member (e.g., a nonwoven fabric) as a support member. FIG. 3(C) is a schematic view illustrating a pressure means comprising a powdery polymer gel material 302 dispersed in another polymer material 303. FIG. 3(D) is a schematic view illustrating a pressure means comprising a polymer gel material 304 held on a support member 305.

The pressure means shown in FIG. 3(A) may be prepared in a manner wherein a polymer gel material is directly formed from an appropriate monomer by way of polymerization and crosslinking reaction or in a manner wherein a polymer gel material is formed by polymerizing an appropriate monomer to obtain a polymer and subjecting the polymer to crosslinking.

The pressure means shown in FIG. 3(B) may be prepared in a manner wherein an appropriate nonwoven member as a support member is immersed in a solution of an appropriate monomer and the resultant is subjected to crosslinking to convert the monomer held on the nonwoven member into a polymer gel material or in a manner wherein an appropriate nonwoven member as a support member is immersed in a solution of an appropriate polymer and the resultant is subjected to crosslinking to convert the polymer held on the nonwoven member into a polymer gel material.

The pressure means shown in FIG. 3(C) may be prepared in a manner wherein a powdery polymer gel material is formed from an appropriate monomer by way of polymerization and crosslinking reaction and the powdery polymer gel material is dispersed in a solution of an appropriate polymer to solidify the powdery polymer gel material in the polymer.

The pressure means shown in FIG. 3(D) may be prepared in a manner (a) wherein a solution of an appropriate polymer is cast onto the surface of an appropriate support member and the resultant is subjected to crosslinking to convert the polymer solution held on the support member into a polymer gel material or in a manner (b) wherein a solution of an appropriate monomer is cast onto the surface of an appropriate support member and the resultant is subjected to polymerization and/or crosslinking to convert the monomer solution held on the support member into a polymer gel material. For the thickness of the polymer gel material 304 in the pressure means shown in FIG. 3(D), it may be the thickness of the polymer gel material obtained in the any of the above while appropriately adjusting the concentration of the solution for the polymer gel material as desired. Alternatively, it may be appropriately adjusted as desired by drying the polymer gel material formed on support member in any of the above and subjecting the resultant to press-treatment to attain a uniform thickness for the polymer gel material.

The thickness of the polymer gel material may be appropriately adjusted as desired by adjusting the kind and concentration of a solvent used or the depth of a reaction vessel used.

For the expansion coefficient of the polymer gel material, it may be appropriately adjusted by appropriately adjusting the related factors such as the kind, polymerization degree, or crosslinking degree of a monomer used, the kind and concentration of a solvent used, the concentration of an electrolyte contained in a solvent used, and the like.

The nonwoven member as the support member used in the pressure means shown in FIG. 3(B) can include nonwoven members of polyolefins such as polypropylene, nonwoven members made of glass, and nonwoven members made of metallic materials. Specific preferable examples are nonwoven members made of metals such as nickel, copper, or the like; nonwoven members made of metal alloys such as stainless steel; and nonwoven members made of ceramics such as alumina, or the like.

Specifically, the formation of a film-like or sheet-like shaped polymer gel material (for example, of the configuration shown in FIG. 3(A) or 3(C)) may be conducted, for example, by means of liquid casting process wherein a polymer solution obtained by dissolving a given polymer in a solvent is cast onto an even surface of a metallic support member while rotating the metallic support member to covert the polymer solution into a film on the metallic support member; a melt extrusion process wherein a polymer liquid obtained by heat-fusing a given polymer is subjected to T-die extrusion to convert the polymer liquid into a film; or a calendering process wherein a given polymer material is passed between two or more rolls to calender the polymer material into a film.

In a detailed embodiment of the liquid casting process, for instance, a polymer gel material film is formed by using a polymer solution containing a given powdery polymer gel material dispersed therein, or a polymer gel material film is formed by converting a given noncrosslinked polymer solution into a film and subjecting the film to crosslinking. In a detailed embodiment of the melt extrusion process, for instance, a polymer gel material film is formed by converting a given noncrosslinked polymer liquid into a film and subjecting the film to crosslinking. In a detailed embodiment of the calendering process, for instance, a polymer gel material film is formed by using a dried polymer gel material.

In the present invention, as previously described, the pressure means for applying a pressure against the anode and the cathode so that the distance between the anode and the cathode is shortened to reduce the internal impedance of the battery may preferably to comprise a polymer gel material capable of expanding and shrinking depending upon the concentration of a solvent and capable of shrinking upon temperature rise. In order for the pressure by the pressure means to be uniformly applied against the anode and the cathode so as to shorten the distance between the two electrodes as desired and also in order for the pressure means to be readily introduced into the battery housing, the pressure means may preferably be shaped in a sheet-like form as previously described. A polymer gel material sheet as such a sheet-like shaped pressure means may be prepared also in a manner (a) of providing a given sheet-like shaped polymer material and subjecting the sheet-like shaped to crosslinking or in a manner (b) of providing a given polymer gel material and subjecting the polymer gel material to press-molding.

In the case where the pressure means takes such a configuration comprising a polymer gel material layer held on a support member as shown in FIG. 3(D), there are advantages such that the size of the pressure means can be readily controlled as desired, and the pressure means can be easily handled. The support member in this case can include members made of metallic materials, members made of ceramics, glass members, and members made of plastics. The support member may be shaped in a plate-like form, punching metal form, woven fabric form, or nonwoven fabric form.

The polymer gel material in this case may be formed on the support member in accordance with the foregoing liquid casting process, melt extrusion process, calendering process, manner (a), or manner (b). Particularly, for instance, it may be formed in a manner of impregnating a given polymer gel material in a given support member such that pores present in the support member are filled by the polymer gel material; a in manner of applying a given polymer solution onto the surface of a given support member to form a coat on the support member and subjecting the coat to crosslinking to gelate the coat on the support member into a polymer gel material; or in a manner wherein a given support member is immersed in a given polymer solution, followed by subjecting to crosslinking, to form a polymer gel material held on the support member. Alternatively, it may employ a manner wherein a given powdery polymer gel material is dispersed in a rubber series polymer having a large elongation percentage and the resultant is processed into a polymer gel material sheet.

As the polymer gel material constituting the pressure means for the electrodes (that is, the anode and cathode) in the rechargeable lithium battery according to the present invention, there can be used, for example, polymer gels (belonging to the so-called organogel) having a network structure swelled by a solvent comprising an organic compound (hereinafter referred to as organic solvent).

Specifically, there can be used, for example, polymer gels having a three-dimensional network structure which is insoluble in an organic solvent, and which are in a swelled state while absorbing said solvent.

As such a polymer gel, there can be mentioned, for example, acrylamide derivatives such as diethylacrylamide-sodium acrylate copolymer, N-isopropylacrylamide-sodium acrylate copolymer, N,N'-diethylacrylamide-sodium acrylate copolymer, and acrylamide(methacrylamidepropyl) trimethylammoniumchloride copolymer, acrylamide-trimethyl(N-acryloyl-3-aminopropyl)ammoniumiodide copolymer; polyvinyl methyl ether; polyvinyl alcohol-polyacrylic acid composite gel; polyacrylic acid; poly-methacrylic acid; methacrylic acid 2-hydroxyethyl; cellulose; polyethylene glycol; polyethylene oxide; polyvinyl alcohol; and the like.

The formation of the polymer gel may be conducted by way of chemical bonding or intermolecular bonding.

Particularly, in the formation of a polymer gel by way of chemical bonding, polymerization is conducted while conducting crosslinking or after conducting polymerization, crosslinking is conducted, thereby forming a polymer gel. The formation of a polymer gel by way of intermolecular bonding may be conducted by causing crosslinking between polymer chains by way of hydrogen bonding, ionic bonding, or coordination bonding.

Specifically, the crosslinking process may be conducted in a manner of forming a crosslinked structure by way of polymerization condensation of a divinyl compound or multifunctional compound, a manner of conducting polymerization and crosslinking at the same time by using thermal energy, photo energy, X-ray, or plasma, or a manner wherein a straight chain polymer is prepared, followed by subjecting the polymer to crosslinking.

In the case where crosslinking is conducted upon preparing a polymer by way of polymerization reaction, there can be employed polymerization by virtue of a radical polymerization initiator while using a crosslinking agent comprising, for example, ethyleneglycoldimethacrylate or methylenebisacrylic amide; radiation-induced polymerization with the irradiation of gamma rays or electron beam; or photopolymerization with the irradiation of light having a wavelength equivalent to the light absorption wavelength of a vinyl monomer in the presence of a photo-crosslinking agent or with the irradiation of light under condition with the addition of a photo sensitizer.

In the case of crosslinking between polymer chains, there can be employed a construction wherein cellulose or polvinyl alcohol having hydroxyl groups is crosslinked by way of chemical reaction with aldehyde. N-methylol compound, carboxylic acid, or bisepoxide; a construction wherein an amino acid group-bearing polymer is gellated with aldehyde or glycidyl group; a construction wherein polyvinyl alcohol or polymethylvinyl ether is crosslinked in water with the irradiation of radiation rays such as gamma rays; a construction wherein polyvinyl alcohol or N-vinyl pyrrolidone is crosslinked with the use of photo-crosslinking agent comprising diazo resin, bisazido, or bichromate; a construction wherein a water soluble polymer such as polyvinyl alcohol is dimerized with a polymer having a photosensitive group such as stilbazolium salt; or a construction wherein a polymer is contacted with a plasma generated by way of discharge in a gas to thereby crosslink the polymer.

The formation of the polymer gel may be conducted by way of the foregoing hydrogen bonding or ionic bonding between polymer chains or by way of chelate formation. Specifically, the formation of the polymer gel may be conducted in a manner wherein hydrogen bond is formed between polymer chains by way of freeze-vacuum drying or freeze-defrosting drying; in a manner wherein two different polymers are mixed, specifically for instance, methacrylic acid is mixed with polyethylene glycol, or polyacrylic acid is mixed with polyvinyl alcohol; or in a manner wherein polycation such as polyvinylbenzyltrimethylammonium is mixed with polyanion such as sodium polystyrenesulfonate, a polyion complexed gel is obtained in this manner. Besides these, there can be also employed a construction wherein polycarboxylic acid such as polyacrylic acid or strongly acidic polymer such as polystyrene sulfonic acid is bonded with an alkali metal or alkaline earth metal to obtain a polymer gel.

In the following, description will be made of the mechanism of the polymer gel material constituting the pressure means to be expanded and shrunk in the rechargeable lithium battery according to the present invention.

In the case where the polymer gel material is present in a good solvent in which the segments of the polymer (that is, the respective monomer portions constituting the polymer) by which the polymer gel material is constituted and the solvent molecule are pulled with each other, the coil-like polymer chain is spread so as to maximize the interaction between the segments and the solvent molecule where the coil-like polymer chain is expanded. As a result, the volume of the polymer gel material is expanded. The volume expansion is continued until the elastic force of the polymer's network structure is balanced with the penetration quantity of the solvent molecule. By the way, in the case where the polymer gel material is present in a bad solvent, it is shrunk.

In the case where the polymer by which the polymer gel material is constituted has an ion-dissociating group (which is capable of donating or receiving an electron to convert into an ion), opposite ions are gathered around charges possessed by the polymer chain to neutralize the charges in an electrolyte solution and due to this, the expanded coil-like polymer chain is returned to the original state.

The strength to expand or shrink the network structure of the polymer by which the polymer gel material is constituted is decided based on the sum of the rubber elasticity, affinity among the polymers and ion concentration. Therefore, the polymer gel material arranged in the rechargeable lithium battery can be expanded by increasing the ratio of the good solvent in the polymer gel material to increase the polymer-polymer affinity.

In the present invention, the expansion mechanism is employed in a rechargeable lithium battery in order to apply a pressure against the anode and the cathode to shorten the distance between the anode and the cathode thereby reducing the internal impedance.

Now, in the present invention, it is possible to use a highly stiff polymer gel obtained by polymerizing a side chain-bearing monomer or a polymer gel having an ion-dissociating group as the polymer gel material. In this case, by increasing the restoring force for the chain shrinkage or the ion density around the polymer, the polymer gel material can be shrunk, whereby the distance between the anode and the cathode can be controlled as desired.

In the case of using a polymer gel having an ion-dissociating group as the polymer gel material, by making it such that the density of an ion having a polarity opposite that of the dissociated group of the polymer gel is increased when the temperature is raised in a solvent, the polymer gel material can be shrunk. Increase at the density of an ion having a polarity opposite that of the dissociated group of the polymer gel may be conducted by using a dilute solution of a salt capable of increasing the thermal motion rate of an ion having the same polarity as that of the dissociated group of the polymer gel as a solvent for the polymer gel or by using a solution of a salt having a solubility capable of being suddenly increased upon temperature rise, wherein the polymer gel is swollen in the solution and is shrunk upon temperature rise. The phase change temperature at which the polymer gel is suddenly shrunk is decided based on the related factors including the kind, polymerization degree and crosslinking degree of the monomer of the polymer gel, the ratio between the good solvent and the poor solvent, the ionic concentration in the solvent, and the like. Therefore, by optimizing these related factors, it is possible to make the polymer gel so that it causes phase change to shrink.

To suddenly increase the concentration of the ion at a given temperature may be effectively conducted by using a polymer gel or a solution in which microcapsules each comprising a given salt covered by a material capable of being dissolved at said temperature are dispersed.

In the rechargeable lithium battery according to the present invention, the foregoing phenomena are used to shrink the polymer gel material constituting the pressure means so as to increase the internal impedance of the battery, whereby the quantity of the electric current to be outputted and inputted when the temperature of the battery is raised is decreased to prevent the occurrence of a state in which the internal pressure of the battery is increased due to the decomposition of the electrolyte solution.

In the following, description will be made of each of the the constituents (excluding the pressure means) of the rechargeable lithium battery according to the present invention.

ANODE

The anode (indicated by reference numeral 102 in FIG. 1) comprises an anode active material (capable of serving as a host material of allowing lithium ions to insert therein and to release therefrom) and an anode collector.

Such anode active material can include lithium metal, carbonous materials including graphite which are capable of intercalating lithium upon charging, transition metal compounds such as transition metal oxides and transition metal sulfides which are capable of intercalating lithium ion upon charging, metallic materials capable of alloying with lithium, porous metallic materials having pores capable of storing a lithium, which will be deposited, therein and which are capable of serving also as an anode collector, and the like.

In the case where the anode active material comprises a lithium metal, the anode may be prepared, for example, by laminating a lithium metal foil on a surface of a given anode collector.

In the case where the anode active material comprises a carbonous material capable of intercalating lithium upon charging, the anode may be prepared, for example, by applying a paste comprising said carbonous material or transition metal compound and a binder on a surface of a given anode collector to form an anode active material layer on the anode collector, or by forming an anode active material layer comprising said carbonous material or transition metal compound on a surface of a given anode collector by way of chemical vapor deposition process.

In the case of using a aluminum foil having an etched surface with an increased specific surface area, it can be used as the anode as it is.

As the porous metallic material having pores capable of storing lithium, which will be deposited, therein and which is capable of serving also as an anode collector, there can be mentioned, for example, metallic materials of copper or the like having a number of pores distributed not only at their surfaces but also inside.

The anode collector serves to efficiently supply an electric current consumed in and to efficiently collect an electric current generated in the battery reaction upon operating charging and discharging. The anode collector is therefore desired to be constituted by a material which has a high electrical conductivity and is inactive to the battery reaction. The material by which the anode collector is constituted can include metals such as Ni, Ti, Cu, Al, Pt, Pd, Au, and Zn, and alloys of two or more these metals such as stainless steel.

The anode collector may be shaped in a plate-like form, foil-like form, mesh form, porous form-like sponge, fabric form, punching metal form, or expanded metal form.

The binder usable upon the formation of the anode active material layer can include polyolefins such as polyethylene, polypropylene, and the like, and fluororesins such as polyvinylidene fluoride, tetrafluoroethylene polymer, and the like.

CATHODE

The cathode (indicated by reference numeral 103 in FIG. 1) generally comprises a cathode collector, a cathode active material (capable of serving as a host material of allowing lithium ions to insert therein and to release therefrom), an electrically conductive assistant, and a binder.

The cathode is generally formed by disposing a mixture of a cathode active material, an electrically conductive assistant and a binder on a member capable of serving as a cathode collector.

The material by which the cathode active material is constituted can include transition metal oxides, transition metal sulfides, lithium-transition metal oxides, and lithium-transition metal sulfides. The transition metal element of these transition metal oxides and transition metal sulfides can include transition metal elements partly having a d-shell or f-shell such as Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag, and Au. Particularly, Ti, V, Cr, Mn, Fe, Co, Ni, and Cu belonging to the first transition series metal element. These are the most appropriate.

The cathode collector serves to efficiently supply an electric current consumed in and to efficiently collect an electric current generated in the battery reaction upon operating discharging and discharging. The cathode collector is therefore desired to be constituted by a material which has a high electrical conductivity and is inactive to the battery reaction. The material by which the cathode collector is constituted can include metals such as Ni, Ti, Cu, Al, Pt, Pd, Au, and Zn, and alloys of two or more these metals such as stainless steel.

The cathode collector may be shaped in a plate-like form, foil-like form, mesh form, porous form-like sponge, fabric form, punched metal form, or expanded metal form.

The above binder can include polyolefins such as polyethylene, polypropylene, and the like, and fluororesins such as polyvinylidene fluoride, tetrafluoroethylene polymer, and the like.

The above electrically conductive assistant can include carbon blacks such as acetylene black and ketjen black, graphite, and metals which are inactive to the battery reaction.

SEPARATOR

The separator (indicated by reference numeral 104 in FIG. 1) is disposed between the anode and the cathode, and serves to prevent the anode and the cathode from suffering internal-shorts. The separator also serves to retain an electrolyte (or an electrolyte solution) as previously described.

The separator is required to have a structure having a number of fine perforations capable of allowing lithium ions to pass through and it is also required to be insoluble in and stable to the electrolyte solution.

The separator is preferably constituted by a nonwoven member or a membrane having a micropore structure made of glass, polyolefins such as polypropylene, polyethylene and the like, or fluororesin. Alternatively, the separator may be constituted by a metal oxide film or a resin film combined with a metal oxide, having a plurality of fine perforations. In a preferred embodiment, the separator is constituted by a multilayered metal oxide film. In this case, the separator effectively prevents a dendrite from passing through and because of this, the occurrence of internal-shorts between the anode and the cathode is prevented. In another preferred embodiment, the separator is constituted by an incombustible fluororesin, glass or metal oxide film. In this case, an improvement can be attained in terms of the safety even in the case where the foregoing internal-shorts should unexpectedly occur.

ELECTROLYTE

In the present invention, there can be used an appropriate electrolyte as it is, a solution of said electrolyte dissolved in a solvent, or a material of said solution having been immobilized using a gelation agent. However, it is preferable that an electrolyte solution obtained by dissolving an appropriate electrolyte in a solvent is used such that said electrolyte solution is retained in a porous member as the separator.

The higher the electrical conductivity of the electrolyte or electrolyte solution, the better. Particularly, it is desired to use an electrolyte or an electrolyte solution such that the electrical conductivity at 25° C. is preferably $1 \times 10^{-3}$ S/cm or more, or more preferably, $5 \times 10^{-3}$ S/cm or more.

The electrolyte usable in the present invention can include inorganic acids such as $H_2SO_4$, HCl and $HNO_3$; salts of $Li^+$ (lithium ion) with Lewis acid ion such as $BF_4^-$, $PF_6^-$, $AsF_6^-$, $ClO_4^-$, $CF_3SO_3^-$, or $BPh_4^-$ (with Ph being a phenyl group); and mixtures of two or more of said salts.

Besides these supporting electrolytes, salts of the above described Lewis acid ions with cations such as sodium ions, potassium ions, tetraalkylammonium ions, or the like can also be used.

In any case, it is desired that the above salts are used after they are subjected to dehydration or deoxygenation, by way of heat treatment at a reduced pressure, for example.

The solvent in which the electrolyte is dissolved can include acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolan, sulfolan, nitrometane, dimethyl sulfide, dimethyl sulfoxide, methyl formate, 3-methyl-2-oxdazolydinone, 2-methyltetrahydrofuran, 3-propylsydonone, sulfur dioxide, phosphoryl chloride, thionyl chloride, sulfulyl chloride, and mixtures of two or more of these.

It is desired that these solvents be subjected to dehydration using activated alumina, molecular sieve, phosphorous pentaoxide, or calcium chloride prior to their use. Alternatively, it is possible for them to be subjected to distillation in an atmosphere of inert gas in the presence of an alkali metal, wherein moisture and foreign matters are removed.

In order to prevent leakage of the electrolyte solution, it is desired for the electrolyte solution to be gelated using an appropriate gelation agent.

The gelation agent usable in this case can include polymers having a property such that they absorb the solvent of the electrolyte solution to swell. Specific examples of such polymers are polyethylene oxide, polyvinyl alcohol, and polyacrylamide.

SHAPE AND STRUCTURE OF THE RECHARGEABLE LITHIUM BATTERY

There is no particular limitation for the shape of the rechargeable lithium battery according to the present invention.

The rechargeable lithium battery according to the present invention may be in the form of a flat round shape (or a coin-like shape), a cylindrical shape, a prismatic shape, or a sheet-like shape.

The present invention having a principal feature in the use of the foregoing specific pressure means is markedly effective in the production of a highly reliable, large prismatic rechargeable lithium battery.

It should be noted that as previously described, in the prior art, it is difficult to attain the production of a reliable large prismatic rechargeable lithium battery because there is not available an appropriate pressure means capable of uniformly applying a pressure against the rectangular anode and cathode such that the distance between the two electrodes is uniformly narrowed, although in the case of a spiral-wound rechargeable lithium battery produced by winding a stacked body comprising a separator interposed between an anode and cathode in multiple, the distance between the anode and cathode can be easily narrowed by applying a desired tension in a spiral state upon winding the stacked body.

Now, in the case of a prismatic rechargeable lithium battery, there is an advantage in that the volume of the device for housing the rechargeable lithium battery can be efficiently used. Fully using this advantage, the foregoing specific pressure means is employed in the rechargeable lithium battery in the present invention.

Besides this, the foregoing specific pressure means according to the present invention can be desirably used also in other rechargeable lithium batteries in the form of a flat round shape, a cylindrical shape, or a sheet-like shape. In any case, there is provided a pronounced advantage.

As previously described, by making the separator to be provided with the foregoing polymer gel material having a function of shrinking to release the pressure upon abnormal temperature rise in the rechargeable lithium battery, a sudden increase in the internal pressure of the rechargeable lithium battery is prevented before it occurs and therefore, the rechargeable lithium battery is always ensured in terms of the safety.

The shape and structure employable in the rechargeable lithium battery according to the present invention will be described in more detail with reference to the drawings.

Figure 4:
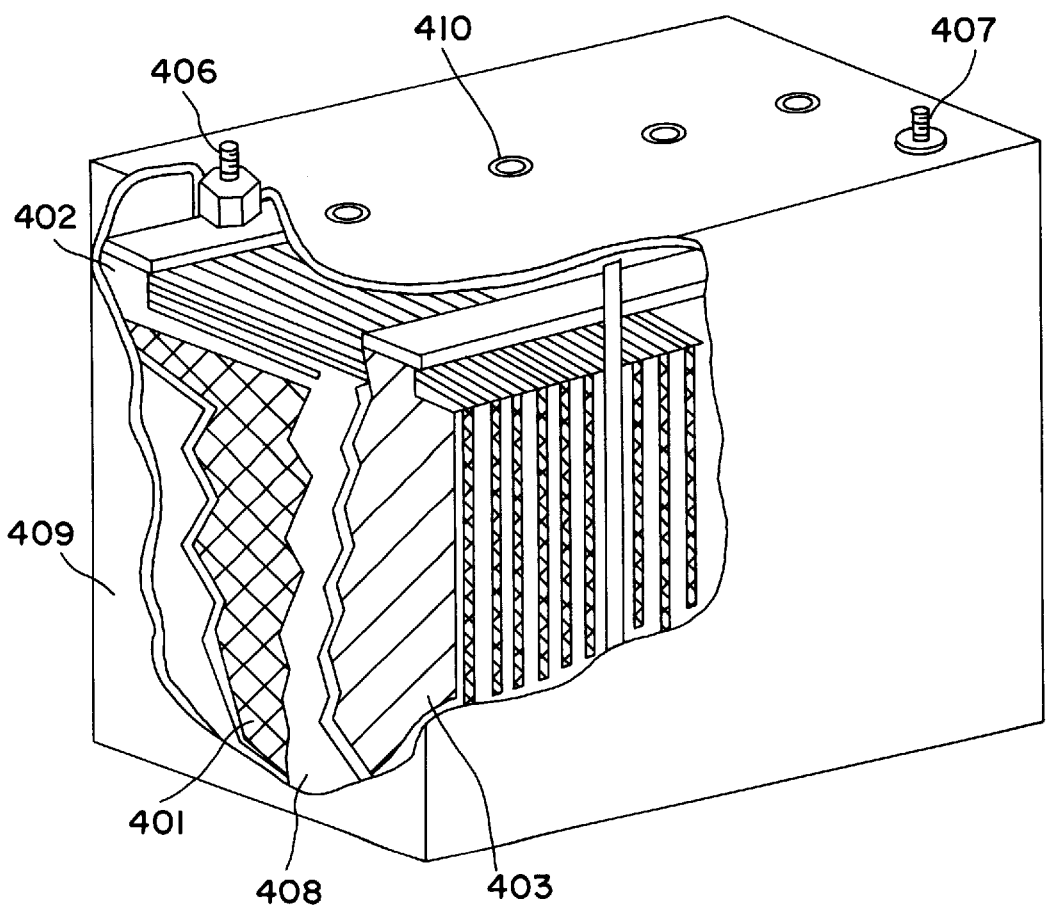
FIG. 4 is a schematic perspective view illustrating an example of the constitution of a prismatic rechargeable lithium battery according to the present invention.
Figure 5:
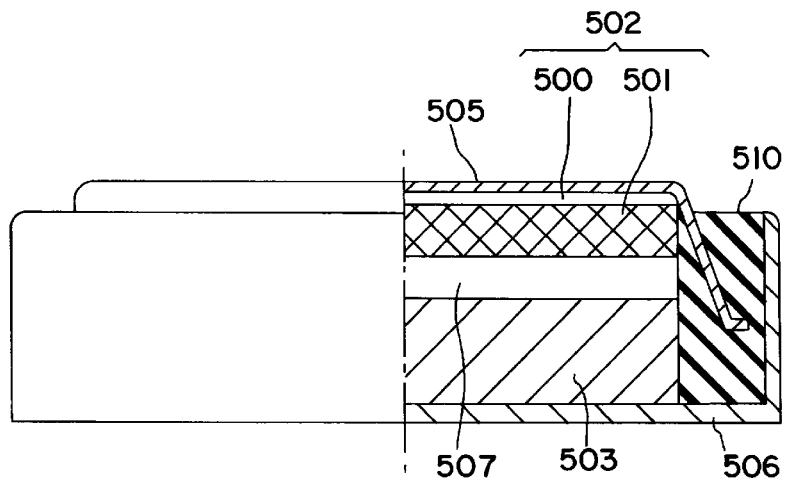
FIG. 5 is a schematic cross-sectional view illustrating an example of a single-layer system flat rechargeable lithium battery according to the present invention.
Figure 6:
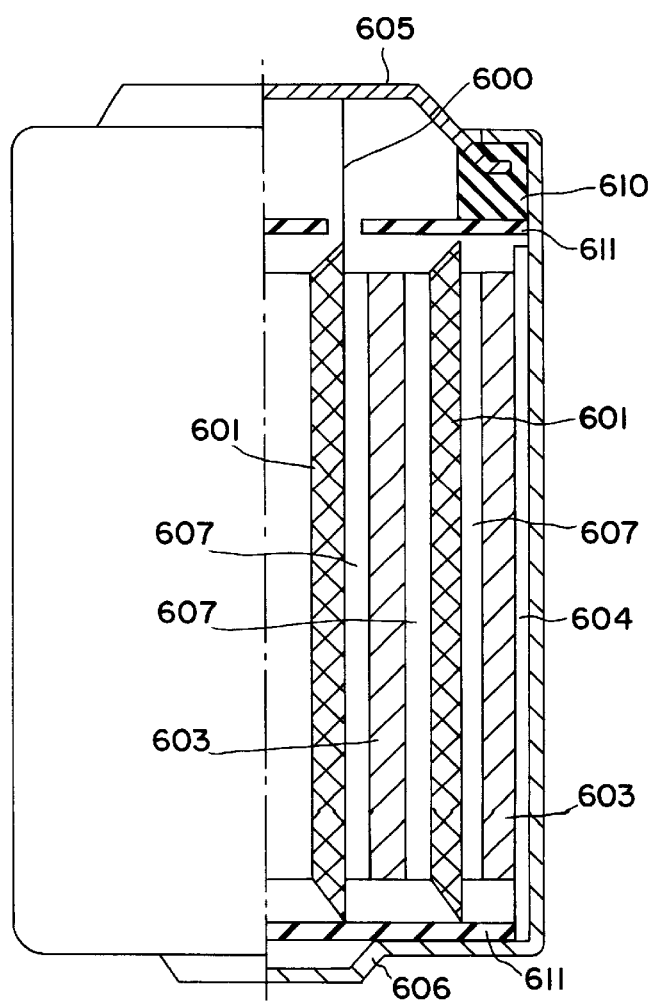
FIG. 6 is a schematic cross-sectional view illustrating an example of a spiral-wound cylindrical rechargeable lithium battery according to the present invention.

The rechargeable lithium battery according to the present invention may take a configuration shown in FIG. 4, 5 or 6.

Particularly, FIG. 4 is a schematic perspective view illustrating an example of a prismatic rechargeable lithium battery. FIG. 5 is a schematic cross-sectional view illustrating an example of a single-layer structure type flat rechargeable lithium battery. FIG. 6 is a schematic cross-sectional view illustrating an example of a spiral-wound cylindrical rechargeable lithium battery.

The prismatic rechargeable lithium battery shown in FIG. 4 comprises a plurality of unit cells integrated in parallel connection through a collector 402 in a battery housing 409 having a capping, wherein each unit cell comprises a separator 408 having an electrolyte solution retained therein interposed between an anode 401 comprising an anode active material and a cathode 403 comprising a cathode active material. The anode 401 is electrically connected to an anode terminal 406, and the cathode 403 is electrically connected to a cathode terminal 407. The prismatic rechargeable lithium battery is provided with a plurality of safety vents 410 at the capping of the battery housing 409.

The fabrication of a prismatic rechargeable lithium battery of the configuration shown in FIG. 4 is conducted, for example, in the following manner. A plurality of unit cells each comprising the separator 408 sandwiched between the anode 401 and the cathode 403 are integrated in parallel connection through the collector 402 into a stacked body. The stacked body is positioned in the battery housing 409. Thereafter, an electrolyte solution is injected into each separator of the stacked body situated in the battery housing 409. Then, the collector 402 is electrically connected to the anode terminal 406 and also to the cathode terminal 407. Finally, the capping is put on the battery hosing 409 to seal the inside of the battery housing.

Now, the battery housing 409 in the configuration shown in FIG. 4 is constituted by a metal such as zinc, stainless steel, titanium clad stainless steel, copper clad stainless steel, nickel-plated steel, a plastic such as polypropylene, or a composite of a metal or glass fiber with plastic.

In FIGS. 5 and 6, each of reference numerals 500 and 600 indicates an anode collector, each of reference numerals 501 and 601 an anode active material layer, reference 502 (in FIG. 5) an anode, each of reference numerals 503 and 603 a cathode active material layer, each of reference numerals 505 and 605 an anode terminal (or an anode cap), each of reference numerals 506 and 606 a cathode can, each of reference numerals 507 and 607 a separator with an electrolyte (or an electrolyte solution) retained therein, and each of reference numerals 510 and 610 an insulating packing. In the configuration shown in FIGS. 5 and 6, the cathode can (506, 606) also serves as a cathode terminal.

In FIG. 6, reference numeral 604 indicates a cathode collector, and reference numeral 611 an insulating plate.

Particularly, in the single-layer structure type flat rechargeable lithium battery shown in FIG. 5, a stacked body comprising the cathode containing the cathode active material (503) and the the anode (502) containing the anode active material (501) and the anode collector (500) stacked and having at least the separator (507) interposed between the cathode and the anode and having an electrolyte solution retained therein is housed in the cathode can 506 on the cathode side. The stacked body in the cathode can 506 is sealed by the insulating packing 510 (comprising an insulating member) and the anode terminal 505 (or the anode cap).

In the spiral-wound cylindrical rechargeable lithium battery shown in FIG. 6, a stacked body wounded in multiple about a predetermined axis is housed in the cathode can 606 such that the side face and a given bottom face side of the stacked body are covered by the cathode can, the stacked body comprising at least the separator (607) having an electrolyte solution retained therein interposed between the cathode containing the cathode active material (603) and the anode containing the anode active material (601). The stacked body in the cathode can 606 is sealed by the insulating packing 610 (comprising an insulating member) and anode cap 605.

The fabrication of a rechargeable lithium battery of the configuration shown in FIG. 5 or FIG. 6 is conducted, for example, in the following manner. A combination comprising the separator (507, 607) interposed between the anode active material layer (501, 601) and the cathode active material layer (503, 603) is positioned in the cathode can (506, 606). Thereafter, the electrolyte is introduced. The resultant is assembled with the anode cap (505, 605) and the insulating packing (510, 610), followed by caulking treatment. Thus, there is obtained the rechargeable lithium battery.

The preparation of the constituent materials for the rechargeable lithium battery is desired to be conducted in a dry air atmosphere free of moisture or a dry inert gas atmosphere free of moisture in order to prevent the occurrence of chemical reaction of lithium with water and also in order to prevent the rechargeable lithium battery from deteriorating due to chemical reaction of lithium with water in the inside of the battery.

As the constituent of the insulating packing (510, 610), there can be used fluororesin, polyamide resin, polysulfone resin, or various rubbers. The sealing is typically conducted using a gasket such as the insulating packing, as shown in FIGS. 5 and 6. Besides this, it can be conducted by means of glass sealing, adhesive sealing, welding or soldering.

As the constituent of the insulating plate 611 shown in FIG. 6, there can be used organic resins and ceramics.

The cathode can (506, 606) and/or the anode cap (505, 605) may be constituted by stainless steel, titanium clad stainless steel, copper clad stainless steel, or nickel-plated steel.

In any of the configurations shown in FIGS. 5 and 6, the cathode can (506, 606) is designed to serve also as a battery housing. In the case where a battery housing is independently used, the battery housing can be constituted by a metal such as zinc, an alloy such as stainless steel, a plastic such as polypropylene, or a composite of a metal or glass fiber with plastic.

Although this scenario is not shown in any of FIGS. 5 and 6, it is possible to use an appropriate safety vent in any of the configurations shown in FIGS. 5 and 6, which serves to ensure the safety when the iside pressure of the rechargeable lithium battery is incidentally increased, by communicating the inside of the rechargeable lithium battery with the outside to thereby reduce the increased inside pressure of the rechargeable lithium battery. The safety vent may be constituted by a material comprising a rubber, a spring or a rupture foil.

In the following, the present invention will be described in more detail with reference to examples, which are only for illustrative purposes but not intended to restrict the scope of the present invention.

EXAMPLE 1 AND COMPARATIVE EXAMPLE 1

Example 1

Figure 7:
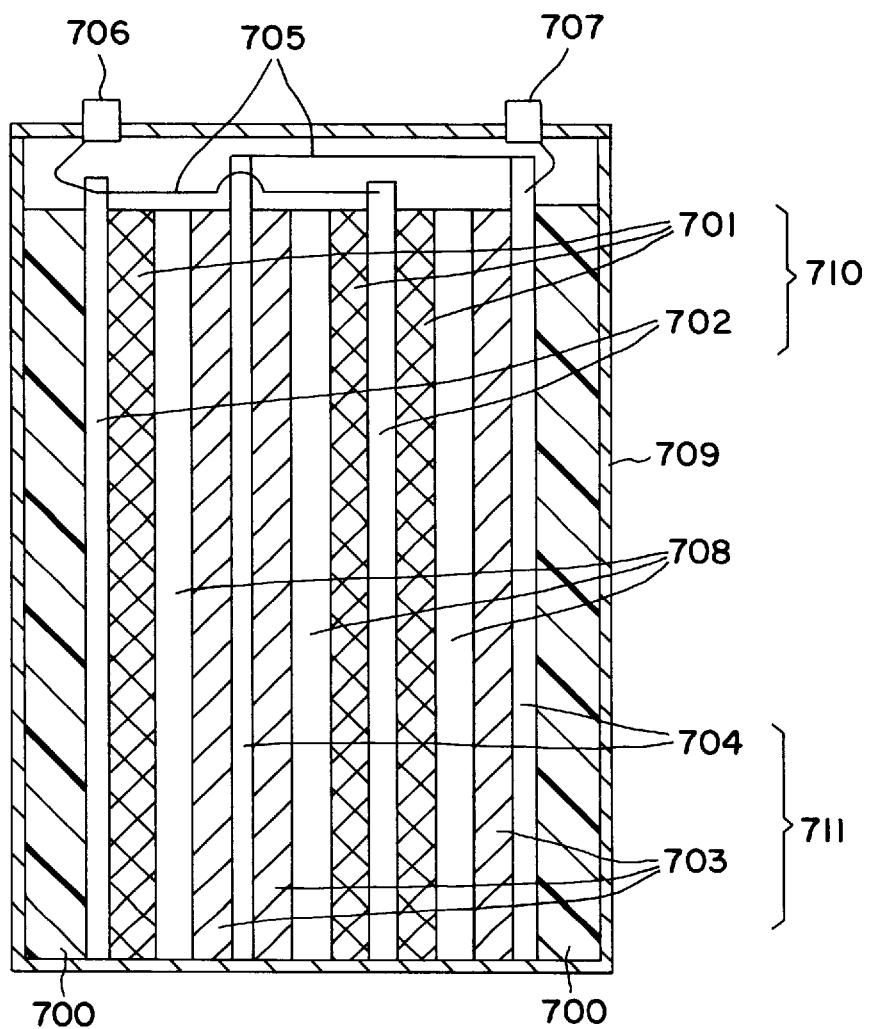
FIG. 7 is a schematic cross-sectional view illustrating an example of a prismatic rechargeable lithium battery according to the present invention.

There was prepared a prismatic rechargeable lithium battery of the configuration shown in FIG. 7.

In FIG. 7, reference numeral 700 indicates a pressure means (comprising a polymer gel), reference numeral 710 an anode comprising an anode active material layer 701 and an anode collector 702, reference numeral 711 a cathode comprising a cathode active material layer 703 and a cathode collector 704, reference numeral 708 a separator, and reference numeral 709 a battery housing (made of an insulating material) having a capping provided with a pair of power outputting and inputting terminals 706 and 707. Reference numeral 705 indicates an electric connection wiring.

The prismatic rechargeable lithium battery was prepared in the following manner.

1. Preparation of pressure means 700:

As the pressure means 700, there were prepared two sheet-like shaped pressure means in a manner as will be described below.

(1) Preparation of polymer gel:

In a reaction vessel, N-isopropylacrylamide as a monomer capable of forming a polymer and N,N'-methylenebisacrylamide as a crosslinking agent were dissolved in water to obtain an aqueous solution, and the aqueous solution was suspended in an paraffin oil to obtain a suspension. The inside atmosphere of the reaction vessel was substituted by nitrogen gas, a polymerization initiator comprising ammonium persulfate and tetramethylethylenediamine was added into the suspension, followed by subjecting the supension to chemical reaction for about 30 minutes, to obtain a gel. The resultant gel was washed with water to remove unreacted monomer, followed by drying under reduced pressure condition, to obtain a powdery polymer material.

(2) Preparation of pressure means 700:

The powdery polymer material obtained above was mixed with an ethylene-propylene-diethane polymer in an amount of 10 wt. %, followed by adding cyclohexane, to obtain a paste. The paste was applied on a nonwoven polypropylene fabric by means of coating process, followed by drying. The resultant was subjected to roll-press treatment to obtain a polymer gel sheet comprising a polymer gel supported by the nonwoven fabric as the pressure means 700.

In this way, there were obtained two sheet-like shaped pressure means 700 each comprising the polymer gel supported by the nonwoven fabric.

2. Formation of anode 710:

There were formed three anodes each comprising an anode active material layer 701 and an anode collector 702.

(1) One of the three anodes was formed in the following manner.

5 wt. % of a polyvinylidene fluoride powder was mixed in a natural graphite fine powder obtained by subjecting natural graphite to heat treatment at 2000° C. in a stream of argon, followed by adding N-methyl-2-pyrrolidone, to obtain a paste. The paste was applied on a surface of a rectangular copper foil provided with an extended connection terminal as the anode collector 702 by means of coating process, followed by drying at 150° C. under reduced pressure condition, whereby an anode active material layer 701 was formed on the surface of the anode collector 702.

Thus, there was obtained an anode 701 (hereinafter referred to as anode 710$a$).

(2) The remaining two anodes were formed into a laminate comprising an anode collector 702 sandwiched between a pair of anode active material layers 701 in the following manner.

5 wt. % of a polyvinylidene fluoride powder was mixed in a natural graphite fine powder obtained by subjecting natural graphite to heat treatment at 2000° C. in a stream of argon, followed by adding N-methyl-2-pyrrolidone, to obtain a paste. The paste was applied on opposite surfaces of a rectangular copper foil provided with an extended connection terminal as the anode collector 702 by means of coating process, followed by drying at 150° C. under reduced pressure condition, whereby an anode active material layer 701 was formed on each of the opposite surfaces of the anode collector 702.

Thus, there was obtained an anode laminate comprising the copper foil as the anode collector 702 sandwiched between a pair of anode active material layers 701 (hereinafter referred to as anode laminate 710$b$).

3. Formation of cathode 711:

There were formed three cathodes each comprising a cathode active material layer 703 and a cathode collector 704.

(1) One of the three cathodes was formed in the following manner.

There were mixed lithium carbonate and cobalt carbonate with a mol ratio of 1:2, followed by subjecting to heat treatment in an air stream maintained at 800° C., to obtain a lithium-cobalt oxide material.

The lithium-cobalt oxide material obtained in the above was mixed with 3 wt. % of acetylene black powder and 5 wt. % of polyvinylidene fluoride powder, followed by adding N-methyl-2-pyrrolidone, to obtain a paste.

The paste was applied on a surface of a rectangular aluminum foil provided with an extended connection terminal as the cathode collector 704 by means of coating process, followed by drying at 150° C. under reduced pressure condition, whereby a cathode active material layer 703 was formed on the surface of the cathode collector 704.

Thus, there was obtained a cathode 711 (hereinafter referred to as cathode 711$a$).

(2) The remaining two cathodes were formed into a laminate comprising a cathode collector 704 sandwiched between a pair of cathode active material layers 703 in the following manner.

There were mixed lithium carbonate and cobalt carbonate with a mol ratio of 1:2, followed by subjecting to heat treatment in an air stream maintained at 800° C., to obtain a lithium-cobalt oxide material.

The lithium-cobalt oxide material obtained in the above was mixed with 3 wt. % of acetylene black powder and 5 wt.

% of polyvinylidene fluoride powder, followed by adding N-methyl-2-pyrrolidone, to obtain a paste.

The paste was applied on opposite surfaces of a rectangular aluminum foil provided with an extended connection terminal as the cathode collector 704 by means of coating process, followed by drying at 150° C. under reduced pressure condition, whereby a cathode active material layer 703 was formed on each of the opposite surfaces of the cathode collector 704.

Thus, there was obtained a cathode laminate comprising the aluminum foil as the cathode collector 704 sandwiched between a pair of cathode active material layers 703 (hereinafter referred to as cathode laminate 711b).

4. Preparation of electrolyte solution:

There was provided a moisture-free mixed solvent composed of ethylene carbonate (EC) and dimethyl carbonate (DMC) with an equivalent mixing ratio. 1M (mol/l) of lithium tetrafluoroborate was dissolved in the mixed solvent. Thus, there was obtained an electrolyte solution.

5. Separator 708:

There were provided three polyethylene members having a number of fine perforations as the separator 708.

In each of the three separators 708, the electrolyte solution obtained in the above step 4 was incorporated such that it is retained in the separator.

6. Fabrication of rechargeable lithium battery:

The fabrication of a rechargeable lithium battery was conducted in a dry argon atmosphere.

There was obtained a stacked body by laminating the polymer gel sheet 700, the anode 710a, the separator 708 (having the electrolyte solution retained therein), the cathode laminate 711b, the separator 708 (having the electrolyte solution retained therein), the anode laminate 710b, the separator 708 (having the electrolyte solution retained therein), the cathode 711a, and the polymer gel sheet 700 in the named order. The stacked body was placed in a battery housing 709 made of polypropylene.

Then, dimethyl sulfoxide was injected into each of the polymer gel sheets 700 situated at the opposite outermost sides of the stacked body to expand the two polymer gel sheets, whereby pressing the stacked body (excluding the polymer get sheets) from the opposite sides. Thereafter, the connection terminals of the anode 710a and the anode laminate 710b were electrically connected to the power outputting and inputting terminal 706 of the capping of the battery housing 709. Similarly, the connection terminals of the cathode 711a and the cathode laminate 711b were electrically connected to the power outputting and inputting terminal 707 of the capping of the battery housing 709. Thereafter, the capping was put to the battery housing to seal the inside of the battery housing.

Thus, there was obtained a rechargeable lithium battery of the configuration shown in FIG. 7.

Comparative Example 1

The procedures of Example 1 were repeated, except that each of the two polymer gel sheets 700 was replaced by a polypropylene sheet and no dimethyl sulfoxide was injected into each polypropylene sheet, to thereby obtain a rechargeable lithium battery of the configuration shown in FIG. 7.

Evaluation

For each of the rechargeable lithium batteries obtained in Example 1 and Comparative Example 1, evaluation was conducted with respect to battery characteristics, i.e., charge-and-discharge efficiency (Coulombic efficiency), charging and discharging cycle life, and average discharge voltage through the charging and discharging cycle test.

The charging and discharging cycle test was conducted by placing each rechargeable lithium battery in a charging and discharging device HJ-106M (produced by Hokuto Denko Kabushiki Kaisha), where charging and discharging were alternately repeated under conditions of 1 C (electric current of 1 times the electric capacity per an hour based on the theoretical electric capacity calculated from the cathode active material of each rechargeable lithium battery) for the charging and discharging, and 30 minutes for the rest. For the other conditions, the cut-off voltage upon operating charging was made 4.5 V and the cut-off voltage upon operating discharging was made 2.5 V.

The charging and discharging cycle test was initiated by operating the charging.

In the charging and discharging test, for each rechargeable lithium battery, evaluation was conducted with respect to (a) charge-and-discharge efficiency (Coulombic efficiency), (b) charging and discharging cycle life, and (c) average discharge voltage,.

The charge-and-discharge efficiency (a) was based on a Coulombic efficiency, that is, a ratio of a discharge capacity to a charge capacity at the time of the third charging and discharging cycle.

In Table 1, the charge-and-discharge efficiency of the rechargeable lithium battery of Example 1 is shown in a value relative to the charge-and-discharge capacity of the rechargeable lithium battery of Comparative Example 1, which is set at 1.

The charging and discharging cycle life (b) was based on the number of the charging and discharging cycles repeated until the battery capacity became less than 60% of that after the third charging and discharging cycle.

In Table 1, the charging and discharging cycle life of the rechargeable lithium battery of Example 1 is shown in a value relative to the charging and discharging cycle life of the rechargeable lithium battery of Comparative Example 1, which is set at 1.

The evaluation of the average discharge voltage (c) was conducted in the following manner. That is, the third discharging has been operated until the time when the discharging voltage reached the cut-off voltage (2.5 V), where there was examined a ratio of an electric energy capable of being discharged by the battery to the electric capacity possessed by the battery. The average discharge voltage was based on this ratio.

In Table 1, the average discharge voltage of the rechargeable lithium battery of Example 1 is shown as a value relative to the average discharge voltage of the rechargeable lithium battery of Comparative Example 1, which is set at 1.

Based on the results shown in Table 1, it is understood that the rechargeable lithium battery obtained in Example 1 is apparently surpassing the rechargeable lithium battery obtained in Comparative Example 1 in terms of the charge-and-discharge efficiency, charging and discharging cycle life, and average discharge voltage.

Example 2

There was prepared a prismatic rechargeable lithium battery having a configuration similar to the configuration shown in FIG. 7.

1. Preparation of pressure means 700:

As the pressure means 700, there were prepared four sheet-like shaped pressure means in a manner as will be described below.

21

(1) Preparation of polymer gel:

In a reaction vessel, acrylamide and trimethyl(N-acryloyl-3-aminopropyl)ammoniumiodide respectively as a monomer capable of forming a polymer, and N,N'-methylenebisacrylamide as a crosslinking agent were dissolved in water to obtain an aqueous solution, and the aqueous solution was suspended in an paraffin oil to obtain a suspension. The inside atmosphere of the reaction vessel was substituted by nitrogen gas, 2,2'-azobis(2-aminodipropane)dihydrochloride as a polymerization initiator was added into the suspension, followed by subjecting the suspension to chemical reaction for about 30 minutes, to obtain a gel. The resultant gel was washed with water to remove unreacted monomers, followed by drying under reduced pressure condition, to obtain a powdery cationic polymer material.

(2) Preparation of pressure means 700:

The powdery cationic polymer material obtained in the above was mixed with an ethylene-propylene-diethane polymer in an amount of 10 wt. %. The resultant mixture was mixed with magnesium iodide as a salt capable of causing a sudden solubility increase upon temperature rise, followed by adding cyclohexane, to obtain a paste. The paste was applied on a nonwoven polypropylene fabric by means of coating process, followed by drying. The resultant was subjected to roll-press treatment to obtain a polymer gel sheet comprising a polymer gel supported by the nonwoven fabric as the pressure means 700.

In this way, there were obtained four sheet-like shaped pressure means 700 each comprising the polymer gel supported by the nonwoven fabric.

2. Formation of anode 710:

There were formed three anodes 710 each comprising an anode active material layer 701 and an anode collector 702.

Each anode was formed in the following manner. That is, 5 wt. % of a polyvinylidene fluoride powder was mixed in a natural graphite fine powder obtained by subjecting natural graphite to heat treatment at 2000° C. in a stream of argon, followed by adding N-methyl-2-pyrrolidone, to obtain a paste. The paste was applied on a surface of a rectangular copper foil provided with an extended connection terminal as the anode collector 702 by means of coating process, followed by drying at 150° C. under reduced pressure condition, whereby an anode active material layer 701 was formed on the surface of the anode collector 702.

Thus, there were obtained three anodes 710.

3. Formation of cathode 711:

There were formed three cathodes 711 each comprising a cathode active material layer 703 and a cathode collector 704.

Each cathode was formed in the following manner. That is, there were mixed lithium carbonate and cobalt carbonate with a mol ratio of 1:2, followed by subjecting to heat treatment in an air stream maintained at 800° C., to obtain a lithium-cobalt oxide material.

The lithium-cobalt oxide material obtained in the above was mixed with 3 wt. % of acetylene black powder and 5 wt. % of polyvinylidene fluoride powder, followed by adding N-methyl-2-pyrrolidone, to obtain a paste.

The paste was applied on a surface of a rectangular aluminum foil provided with an extended connection terminal as the cathode collector 704 by means of coating process, followed by drying at 150° C. under reduced pressure condition, whereby a cathode active material layer 703 was formed on the surface of the cathode collector 704.

Thus, there were obtained three cathodes 711.

22

4. Preparation of electrolyte solution:

There was provided a moisture-free mixed solvent composed of ethylene carbonate (EC) and dimethyl carbonate (DMC) with an equivalent mixing ratio. 1M (mol/l) of lithium tetrafluoroborate was dissolved in the mixed solvent. Thus, there was obtained an electrolyte solution.

5. Separator 708:

There were provided three polyethylene members having a number of fine perforations as the separator 708.

In each of the three separators 708, the electrolyte solution obtained in the above step 4 was incorporated such that it is retained in the separator.

6. Fabrication of rechargeable lithium battery:

The fabrication of a rechargeable lithium battery was conducted in a dry argon atmosphere.

There were provided three laminates each obtained by laminating the anode 710, the separator 708 (having the electrolyte solution retained therein), and the cathode 711.

Each laminate was introduced into a heat-shrinkable tubing made of a tetrafluoroethylene-hexafluoropropylene copolymer (not shown in the figure), followed by subjecting to heat-pressure treatment at 120° C., where an end side of the heat-shrinkable tubing with the absence of the connection terminals of the anode and cathode was fuse-sealed, to obtain a packaged cell unit.

In this way, there were obtained three cell units.

Each cell unit was sandwiched between a pair of the polymer gel sheets 700 to obtain a stacked body having a configuration comprising the polymer gel sheet/the unit cell/the polymer gel sheet/the unit cell/the polymer gel sheet/the unit cell/the polymer gel sheet.

The resultant stacked body was placed in a battery housing 709 made of polypropylene.

Then, a mixed solvent composed of ethylene carbonate and dimethyl carbonate was injected into each of the polymer gel sheets 700 to expand each polymer gel sheet, whereby pressing each unit cell (comprising the anode, separator and cathode) by the two polymer gel sheets situated on the opposite sides of the unit cell. Thereafter, the connection terminals of the three anodes 710 were electrically connected to the power outputting and inputting terminal 706 of the capping of the battery housing 709. Similarly, the connection terminals of the three cathodes 711 were electrically connected to the power outputting and inputting terminal 707 of the capping of the battery housing 709. Thereafter, the capping was put to the battery housing to seal the inside of the battery housing.

Thus, there was obtained a prismatic rechargeable lithium battery.

In the above, by using the foregoing heat-shrinkable tubing, the anode, separator and cathode could be readily integrated as desired without being deviated. Therefore, the fabrication of the rechargeable lithium battery could be efficiently conducted. In addition, by packing each laminate (comprising the anode, separator and cathode) in the heat-shrinkable tubing one end side of which being sealed, even in the case where the amount of the electrolyte solution should be excessive, the occurrence of a problem of leaking the electrolyte solution to invade into the the polymer gel sheet whereby causing a phase change in the polymer gel layer of the polymer gel sheet could be prevented. And the pressure in the battery could be uniformly maintained. Hence, the rechargeable lithium battery continuously exhibited a desirable battery performance.

Evaluation

For the rechargeable lithium battery obtained in Example 2, evaluation was conducted with respect to (a) charge-anddischarge efficiency (Coulombic efficiency), (b) charging and discharging cycle life, and (c) average discharge voltage through the charging and discharging cycle test in the same manner as in Example 1 and Comparative Example 1.

In Table 2, the charge-and-discharge efficiency of the rechargeable lithium battery of Example 2 is shown as a value relative to the charge-and-discharge capacity of the rechargeable lithium battery of Comparative Example 1 (obtained in the foregoing evaluation), which is set at 1.

In Table 2, the charging and discharging cycle life of the rechargeable lithium battery of Example 2 is shown as a value relative to the charging and discharging cycle life of the rechargeable lithium battery of Comparative Example 1 (obtained in the foregoing evaluation), which is set at 1.

In Table 2, the average discharge voltage of the rechargeable lithium battery of Example 2 is shown as a value relative to the average discharge voltage of the rechargeable lithium battery of Comparative Example 1 (obtained in the foregoing evaluation), which is set at 1.

Based on the results shown in Table 2, it is understood that the rechargeable lithium battery obtained in Example 2 surpasses the rechargeable lithium battery obtained in Comparative Example 1 in terms of the charge-and-discharge efficiency, charging and discharging cycle life, and average discharge voltage.

EXAMPLE 3 AND COMPARATIVE EXAMPLE 2

Example 3

There was prepared a single-layer structure type flat rechargeable lithium battery of the configuration shown in FIG. 5 in the following manner.

1. Formation of anode 502:

There was provided an Al/Cu clad foil having a surface etched with the use of an aqueous solution containing 5 wt. % of potassium hydroxide. The Al/Cu clad foil was immersed in a sulfuric acid aqueous solution of 12M(mol/l) as an electrolyte solution, and a glassy carbon member as a counter electrode was also immersed in said sulfuric acid aqueous solution. And a D.C. voltage of 30 V was impressed between the Al/Cu clad foil and the glassy carbon member, whereby the etched surface of the Al/Cu clad foil was anodized. The Al/Cu clad foil thus treated was washed with pure water, successively washed with acetone and isopropyl alcohol, followed by drying. The resultant was dried at 150° C. under reduced pressure condition. Thus, there was obtained an anode 502.

2. Formation of cathode 503:

There were mixed manganese nitrate and lithium carbonate with a mol ration of 7:3, followed by subjecting to heat treatment in an air stream maintained at 650° C., to obtain a lithium-manganese oxide material.

The resultant lithium-manganese oxide material was mixed with 5 wt. % of acetylene black powder and 5 wt. % of polyvinylidene fluoride powder, followed by adding N-methyl-2-pyrrolidone, to obtain a paste.

The paste thus obtained was applied on an aluminum foil as a cathode collector by means of coating process, followed by drying at 150° C. under reduced pressure condition.

Thus, there was obtained a cathode 503.

3. Coating the anode and cathode by a polymer gel:

The anode 502 obtained in the above step 1 was cut into a round shape. Similarly, the cathode 503 obtained in the above step 2 was cut into a round shape. On a surface of each round-shaped electrode, an aqueous solution of polyethylene glycol was applied by means of coating process to form a liquid coat. The liquid coat formed on each round-shaped electrode was subjected to irradiation of electron beam to crosslink the liquid coat into a polyethylene glycol gel layer. Each round-shaped electrode covered by the polyethylene glycol gel layer was subjected to freeze drying under reduced pressure condition, followed by subjecting it to pressure molding, then followed by subjecting; drying under reduced pressure condition. By this, there were obtained an anode 502 covered by a polyethylene glycol dry gel layer and a cathode 503 covered by a polyethylene glycol dry gel layer.

Herein, the polyethylene glycol dry gel layer serves as a separator 507.

4. Preparation of electrolyte solution:

There was provided a moisture-free mixed solvent composed of ethylene carbonate (EC) and dimethyl carbonate (DMC) with an equivalent mixing ratio. 1M (mol/l) of lithium tetrafluoroborate was dissolved in the mixed solvent. Thus, there was obtained an electrolyte solution.

5. Fabrication of rechargeable lithium battery:

The fabrication of a rechargeable lithium battery was conducted in a dry argon atmosphere.

The cathode 503 covered by the polyethylene glycol dry gel layer and the anode 502 covered by the polyethylene glycol dry gel layer in combination were inserted into a cathode can 506 made of a titanium clad stainless steel such that the polyethylene glycol dry gel layer of the cathode was contacted with that of the anode. Then, the electrolyte solution was injected into the polyethylene glycol dry gel layer of each of the cathode and anode. The resultant was sealed using an anode cap 505 made of a stainless steel and an insulating packing 510 made of polypropylene.

Thus, there was obtained a single-layer structure type flat rechargeable lithium battery.

Comparative Example 2

The procedures of Example 3 were repeated, except that no polyethylene glycol dry gel layer was formed on any of the anode and cathode, and a separator 507 comprising a polyethylene member with a number of fine perforations and having the electrolyte solution retained therein was interposed between the anode 502 and the cathode 503, to obtain a single-layer structure type flat rechargeable lithium battery.

Evaluation

For each of the rechargeable lithium batteries obtained in Example 3 and Comparative Example 2, evaluation was conducted with respect to (a) charge-and-discharge efficiency (Coulombic efficiency), (b) charging and discharging cycle life, and (c) average discharge voltage through the charging and discharging cycle test in the same manner as in Example 1 and Comparative Example 1.

In Table 3, the charge-and-discharge efficiency of the rechargeable lithium battery of Example 3 is shown as a value relative to the charge-and-discharge efficiency of the rechargeable lithium battery of Comparative Example 2, which is set at 1.

In Table 3, the charging and discharging cycle life of the rechargeable lithium battery of Example 3 is shown as a value relative to the charging and discharging cycle life of the rechargeable lithium battery of Comparative Example 2, which is set at 1.

In Table 3, the average discharge voltage of the rechargeable lithium battery of Example 3 is shown in a value relative to the average discharge voltage of rechargeable lithium battery of Comparative Example 2, which is set at 1.

Based on the results shown in Table 3, it is understood that the rechargeable lithium battery obtained in Example 3 is apparently surpassing the rechargeable lithium battery obtained in Comparative Example 2 in terms of the charging and discharging cycle life, and the former is superior to the latter also in terms of the charge-and-discharge efficiency and average discharge voltage.

EXAMPLE 4 AND COMPARATIVE EXAMPLE 3

Example 4

There was prepared a spiral-wound cylindrical rechargeable lithium battery of the configuration shown in FIG. 6 in the following manner.

1. Preparation of polymer gel:

In accordance with the procedures for the preparation of polymer gel in the foregoing step 1-(1) in Example 1, there was prepared a powdery polymer gel material.

2. Preparation of separator 607:

The powdery polymer gel material obtained in the above step 1 was dispersed in an aqueous solution of polyethylene glycol to obtain a dispersion (comprising the powdery polymer gel material dispersed in the polyethylene glycol aqueous solution). The dispersion thus obtained was applied the entire surfaces of a polypropylene film having a number of fine perforations by means of dip coating process to form a coat film on the polypropylene film, followed by drying under reduced pressure condition, to obtain a separator film covered by a polymer gel layer as the separator 607.

3. Formation of anode 601:

There was provided an Al/Cu/Al clad foil having opposite aluminum surfaces etched with the use of an aqueous solution containing 5 wt. % of potassium hydroxide. The Al/Cu/Al clad foil was immersed in a sulfuric acid aqueous solution of 12M(mol/l) as an electrolyte solution, and a glassy carbon member as a counter electrode was also immersed in said sulfuric acid aqueous solution. And a D.C. voltage of 30 V was applied between the Al/Cu/Al clad foil and the glassy carbon member, whereby the etched opposite aluminum surfaces of the Al/Cu/Al clad foil were anodized. The Al/Cu/Al clad foil thus treated was washed with pure water, successively washed with acetone and isopropyl alcohol, followed by drying. The resultant was dried at 150° C. under reduced pressure condition. Thus, an anode 601 was obtained.

At an end portion of the resultant anode 601, a power outputting and inputting terminal 600 comprising a nickel foil tab was welded using laser.

4. Formation of cathode 603:

There were mixed manganese dioxide and lithium nitrate with a mal ration of 7:3, followed by subjecting to heat treatment in an air stream maintained at 330° C., to obtain a lithium-manganese oxide material.

The resultant lithium-manganese oxide material was mixed with 3 wt. % of acetylene black powder and 5 wt. % of polyvinylidene fluoride powder, followed by adding N-methyl-2-pyrrolidone, to obtain a paste.

The paste thus obtained was applied on opposite surfaces of an aluminum foil provided with an extended connection terminal as a cathode collector by means of coating process, followed by drying and then followed by drying at 150° C. under reduced pressure condition.

Thus, a cathode 603 was obtained.

5. Preparation of electrolyte solution:

There was provided a moisture-free mixed solvent composed of ethylene carbonate (EC) and dimethyl carbonate (DMC) with an equivalent mixing ratio. 1M (mol/l) of lithium tetrafluoroborate was dissolved in the mixed solvent. Thus, an electrolyte solution was obtained.

6. Fabrication of rechargeable lithium battery:

The fabrication of a rechargeable lithium battery was conducted in a dry argon atmosphere.

The cathode 603, the separator 607 (covered by the polymer gel layer) and the anode 601 were wound by means of a winding machine while applying a tension in a spiral-like state to obtain a sprirally wound stacked body. The connection terminal of the cathode of the spirally wound stacked body was spot-welded to a bottom portion of a cathode can 606 made of a titanium clad stainless steel, and the spirally wound stacked body was inserted into the cathode can 606. In the following calking step, the cathode can 606 was furrowed by means of a necking device. Then, the connection terminal of the anode of the spirally wound stacked body was welded to an anode cap 605 made of a stainless steel using laser. Successively, the electrolyte solution was injected into the separator 607 of the sprirally wound stacked body. Thereafter, an insulating packing 610 made of polypropylene was arranged in the cathode can 606, and the anode cap 605 was capped to the cathode can. The resultant was treated by means of a caulking machine. Thus, a spiral-wound cylindrical rechargeable lithium battery was obtained.

Comparative Example 3

The procedures of Example 4 were repeated, except that a polypropylene film having a number of fine perforations which is provided with no such polymer gel layer as in Example 4 was used as the separator 607, to thereby obtain a spiral-wound cylindrical rechargeable lithium battery.

Evaluation

For each of the rechargeable lithium batteries obtained in Example 4 and Comparative Example 3, evaluation was conducted with respect to (a) charge-and-discharge efficiency (Coulombic efficiency), (b) charging and discharging cycle life, and (c) average discharge voltage through the charging and discharging cycle test in the same manner as in Example 1 and Comparative Example 1.

In Table 4, the charge-and-discharge efficiency of the rechargeable lithium battery of Example 4 is shown as a value relative to the charge-and-discharge efficiency of the rechargeable lithium battery of Comparative Example 3, which is set at 1.

In Table 4, the charging and discharging cycle life of the rechargeable lithium battery of Example 4 is shown as a value relative to the charging and discharging cycle life of the rechargeable lithium battery of Comparative Example 3, which is set at 1.

In Table 4, the average discharge voltage of the rechargeable lithium battery of Example 4 is shown as a value relative to the average discharge voltage of rechargeable lithium battery of Comparative Example 3, which is set at 1.

Based on the results shown in Table 4, it is understood that the rechargeable lithium battery obtained in Example 4 surpasses the rechargeable lithium battery obtained in Comparative Example 3 in terms of the charging and discharging cycle life, and the former is superior to the latter also in terms of the charge-and-discharge efficiency and average discharge voltage.

EXAMPLE 5 AND COMPARATIVE EXAMPLE 4

Example 5

Figure 8:
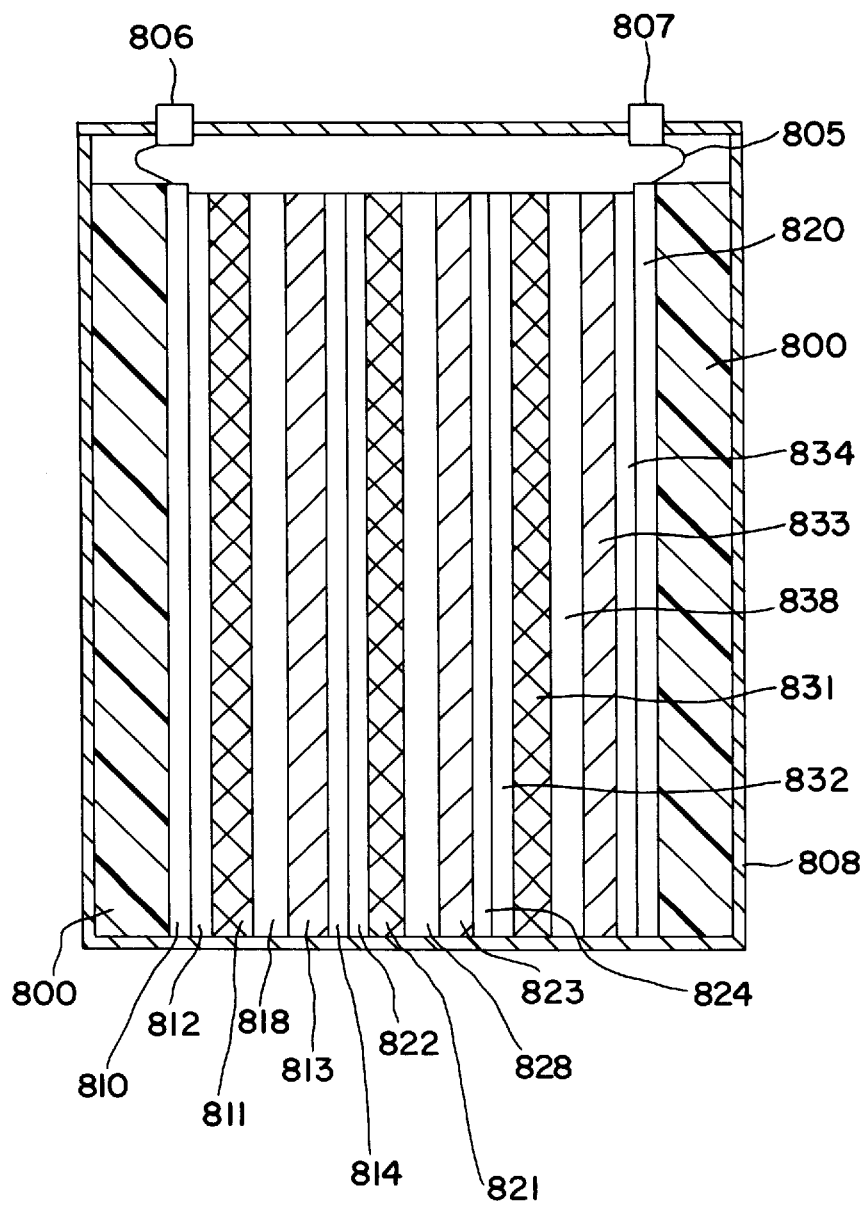
FIG. 8 is a schematic cross-sectional view illustrating another example of a rectangular prismatic rechargeable lithium battery according to the present invention.

There was prepared a prismatic rechargeable lithium battery of the configuration shown in FIG. 8.

The rechargeable lithium battery shown in FIG. 8 comprises a stacked body comprising three unit cells integrated in series connection sandwiched between a pair of sheet-like shaped pressure means each comprising a polymer gel material layer 800 and a electrically conductive metal plate (810, 820) situated on the side of the stacked body so as to contact the anode or cathode collector of the stacked body in a battery housing 808 (made of an insulating material), wherein a first unit cell comprises an anode has an anode collector 812 and an anode active material layer 811, a separator 818, and a cathode comprising a cathode active material layer 813 and a cathode collector 814; a second unit cell comprises an anode comprising an anode collector 822 and an anode active material layer 821, a separator 828, and a cathode comprising a cathode active material layer 823 and a cathode collector 824; and a third unit cell comprises an anode collector 832 and an anode active material layer 831, a separator 838, and a cathode comprising a cathode active material layer 833 and a cathode collector 834. The battery housing has a capping provided with a pair of power outputting and inputting terminals 806 and 807 each being electrically connected to the metal plate 810 or 820 contacted with the anode collector or the cathode collector of the stacked body by way of a connection wire 805.

The prismatic rechargeable lithium battery was prepared in the following manner.

1. Preparation of pressure means:

As the pressure means, there were prepared two sheet-like shaped pressure means, namely, first and second sheet-like shaped pressure means (a) and (b) each comprising a polymer gel material layer 800 and a support member 810 or 820 (comprising an electrically conductive metal plate).

The first and second sheet-like shaped pressure means were prepared in the following manner.

(1) Preparation of polymer gel:

In a reaction vessel, sodium styrene sulfonate as a monomer capable of forming a polymer and N,N'-methylenebisacrylamide as a crosslinking agent were dissolved in water to obtain an aqueous solution, and the aqueous solution was suspended in an paraffin oil to obtain a suspension. The inside atmosphere of the reaction vessel was substituted by nitrogen gas, a polymerization initiator comprising ammonium persulfate and tetramethylethylenediamine was added into the suspension, followed by subjecting to chemical reaction for about 30 minutes, to obtain a gel. The resultant gel was washed with water to remove unreacted monomer, followed by drying under reduced pressure condition, to obtain a powdery anionic polymer gel material.

(2) Preparation of first and second sheet-like shaped pressure means:

The polymer gel material obtained in the above was mixed with an ethylene-propylene-diethane polymer in an amount of 10 wt. % to obtain a mixture. The resultant mixture was mixed with microcapsules each comprising sodium iodide enclosed by a low molecular weight polyethylene capable of being fused at a temperature of about 100° C., followed by adding N-methyl-2-pyrrolidone to obtain a paste.

A part of the paste was applied on a surface of a copper plate as the electrically conductive plate 810 by means of coating process, followed by drying under reduced pressure condition, to obtain a first sheet-like shaped pressure means (a) comprising a polymer gel layer 800 supported on the copper plate 810.

Similarly, the remaining paste was applied on a surface of an aluminum plate as the electrically conductive plate 820 by means of coating process, followed by drying under reduced pressure condition, to obtain a second sheet-like shaped pressure means (b) comprising a polymer gel layer 800 supported on the aluminum plate 820.

2. Formation of anode:

There were formed first, second and third anodes (a), (b) and (c) each comprising an anode active material layer (811, 821, 831) and an anode collector (812, 822, 832).

Each of the three anodes was formed in the following manner.

5 wt. % of a polyvinylidene fluoride powder was mixed in a natural graphite fine powder obtained by subjecting natural graphite to heat treatment at 2000° C. in a stream of argon, followed by adding N-methyl-2-pyrrolidone, to obtain a paste. The paste was applied on a surface of a rectangular copper foil as the anode collector (812, 822, 832) by means of coating process, followed by drying at 150° C. under reduced pressure condition, whereby an anode active material layer (811, 821, 831) was formed on the surface of the anode collector (821, 822, 832) (comprising the copper foil).

Thus, there were obtained a first anode (a), a second anode (b) and a third anode (c).

3. Formation of cathode:

There were formed first, second and third cathodes (a), (b) and (c) each comprising a cathode active material layer (813, 823, 833) and a cathode collector (814, 824, 834).

Each of the three cathodes was formed in the following manner.

There were mixed lithium nitrate and nickel carbonate with a mol ratio of 1:1, followed by subjecting to heat treatment in an air stream maintained at 750° C., to obtain a lithium-nickel oxide material.

The lithium-nickel oxide material obtained in the above was mixed with 3 wt. % of acetylene black powder and 5 wt. % of polyvinylidene fluoride powder, followed by adding N-methyl-2-pyrrolidone, to obtain a paste.

The paste was applied on a surface of a rectangular aluminum foil the cathode collector (814, 824, 834) by means of coating process, followed by drying at 150° C. under reduced pressure condition, whereby a cathode active material layer (813, 823, 833) was formed on the surface of the cathode collector (814, 824, 834) (comprising the aluminum foil).

Thus, there were obtained a first cathode (a), a second cathode (b) and a third cathode (c).

4. Preparation of electrolyte solution:

There was provided a moisture-free mixed solvent composed of ethylene carbonate (EC) and dimethyl carbonate (DMC) with an equivalent mixing ratio. 1M (mol/l) of lithium tetrafluoroborate was dissolved in the mixed solvent. Thus, there was obtained an electrolyte solution.

5. Separator:

There were provided three polypropylene members having a number of fine perforations as the separators 818, 828, and 838.

In each of the three separators 818, 828, and 838, the electrolyte solution obtained in the above step 4 was incorporated such that it is retained in the separator.

6. Fabrication of rechargeable lithium battery:

The fabrication of a rechargeable lithium battery was conducted in a dry argon atmosphere.

There was obtained a stacked body comprising three unit cells in the following manner. There were laminated the first anode (a), the separator 818 (having the electrolyte solution retained therein) and the first cathode (a) to establish a first unit cell; the second anode (b), the separator 828 (having the electrolyte solution retained therein) and the second cathode (b) to establish a second unit cell; and the third anode (c), the separator 838 (having the electrolyte solution retained therein) and the third cathode (c) to establish a third unit cell. The stacked body was sandwiched between the first sheet-like shaped pressure means (a) and the second sheet-like shaped pressure means (b) such that the anode collector 812 of the first unit cell was contacted with the copper plate 810 of the first sheet-like shaped pressure means (a) and the cathode collector 834 of the third unit cell was contacted with the aluminum plate 820 of the second sheet-like shaped pressure means (b).

The resultant obtained was inserted in a battery housing 808 made of polypropylene, having a capping provided with a pair of power outputting and inputting terminals 806 and 807.

Then, dimethyl carbonate was injected into the polymer gel layer 800 of each of the first and second sheet-like shaped pressure means (a) and (b) situated on the opposite outermost sides of the stacked body to expand the two polymer gel layers, whereby pressing the stacked body from the opposite sides through the copper and aluminum plates 810 and 820. Thereafter, the copper plate 810 of the first sheet-like shaped pressure means (a) was electrically connected to the power outputting and inputting terminal 806 of the capping of the battery housing 808 by way of a connection wire 805. Similarly, the aluminum plate 820 of the second sheet-like shaped pressure means (b) was electrically connected to the power outputting and inputting terminal 807 of the capping of the battery housing 808 by way of a connection wire 805. Then, the capping was capped to the battery casing to seal the battery casing.

Thus, there was obtained a rectangular prismatic rechargeable lithium battery.

Incidentally, it should be understood that the microcapsules dispersed in the polymer gel layer 800 of each of the foregoing first and second sheet-like shaped pressure means (a) and (b) are fused and broken to release the sodium iodide contained therein and the sodium iodide is dissolved in the dimethyl carbonate as a solvent serving to expand the polymer gel material of the polymer gel material layer, where the sodium iodide is dissociated into ions.

Comparative Example 4

The procedures of Example 5 were repeated, except that the first and second sheet-like shaped pressure means (a) and (b) were replaced by a copper plate coated with polypropylene and an aluminum plate coated with polypropylene, to thereby obtain a prismatic rechargeable lithium battery.

Evaluation

For each of the rechargeable lithium batteries obtained in Example 5 and Comparative Example 4, evaluation was conducted with respect to (a) charge-and-discharge efficiency (Coulombic efficiency), (b) charging and discharging cycle life, and (c) average discharge voltage through the charging and discharging cycle test in the same manner as in Example 1 and Comparative Example 1.

In Table 5, the charge-and-discharge efficiency of the rechargeable lithium battery of Example 5 is shown as a value relative to the charge-and-discharge capacity of the rechargeable lithium battery of Comparative Example 4, which is set at 1.

In Table 5, the charging and discharging cycle life of the rechargeable lithium battery of Example 5 is shown as a value relative to the charging and discharging cycle life of the rechargeable lithium battery of Comparative Example 4, which is set at 1.

In Table 5, the average discharge voltage of the rechargeable lithium battery of Example 5 is shown as a value relative to the average discharge voltage of the rechargeable lithium battery of Comparative Example 4, which is set at 1.

Based on the results shown in Table 5, it is understood that the rechargeable lithium battery obtained in Example 5 surpasses the rechargeable lithium battery obtained in Comparative Example 4 in terms of the charge-and-discharge efficiency, charging and discharging cycle life, and average discharge voltage.

Separately, for the rechargeable lithium batteries obtained in the foregoing Examples 1 to 5 and Comparative Examples 1 to 4, evaluation was conducted with respect to internal resistance as will be described below.

(1) For each of the rechargeable lithium batteries obtained in Examples 1 and 2 and Comparative Example 1, through the foregoing charging and discharging cycle test, the charging and discharging cycle was conducted once, and the internal resistance (hereinafter referred to as first internal resistance (i)) was measured while maintaining the rechargeable lithium battery at 25° C. Thereafter, the rechargeable lithium battery was heated to 100° C., and the internal resistance (hereinafter second internal resistance (ii)) was measured. Successively, the rechargeable lithium battery was cooled down to 25° C., and the internal resistance (hereinafter referred to as third internal resistance (iii)) was measured. For the measured three internal resistances (i) to (iii), a rate of change based on the first internal resistance (i) was calculated.

In Table 6, the first internal resistance (i) for each of the rechargeable lithium batteries of Examples 1 and 2 is shown in a value relative that for the rechargeable lithium battery of Comparative Example 1, which is set at 1.

(2) In the same manner as in the above (1), the first internal resistance (i) for each of the rechargeable lithium batteries of Example 3 and Comparative Example 2. In Table 6, the resultant rate of change for the rechargeable lithium battery of Example 3 is shown as a value relative that for the rechargeable lithium battery of Comparative Example 2, which is set at 1.

(3) In the same manner as in the above (1), the first internal resistance (i) was obtained for each of the rechargeable lithium batteries of Example 4 and Comparative Example 3. In Table 6, the first internal resistance (i) for the rechargeable lithium battery of Example 4 is shown as a value relative that for the rechargeable lithium battery of Comparative Example 3, which is set at 1.

(4) In the same manner as in the above (1), the first internal resistance (i) was obtained for each of the rechargeable lithium batteries of Example 5 and Comparative Example 4. In Table 6, the first internal resistance (i) for the rechargeable lithium battery of Example 5 is shown as a value relative that for the rechargeable lithium battery of Comparative Example 4, which is set at 1.

(5) For each of the rechargeable lithium batteries of Examples 1, 2, 4, and 5, each of the second internal resistance (ii) (measured when the temperature of the rechargeable lithium battery was raised from 25° C. to 100° C.) and the third internal resistance (iii) (measured when the temperature of the rechargeable lithium battery was cooled from 100° C. to 25° C.) is shown as Table 7 in a value relative to the first internal resistance (i) (measured when the temperature of the rechargeable lithium battery was maintained at 25° C.), which is set at 1.

Based on the results shown in Table 6, it is understood that the use of the polymer gel material as the pressure means according to the present invention enables to reduce the battery's internal resistance as desired:

Based on the results shown in Table 7, the following facts are understood. That is, for a rechargeable lithium battery in which a given pressure means comprising the polymer gel material according to the present invention is used, when as the pressure means, one prepared by an appropriate preparation manner is used, the internal resistance of the rechargeable lithium battery is raised when the rechargeable lithium battery is heated. In addition, in this case, the raised internal resistance recovers to a reduced level when the rechargeable lithium battery is cooled to low temperature (see, the changes in internal resistances of Examples 1, 2, 4, and 5 in Table 7). And the internal pressure raised when the rechargeable battery is heated to high temperature is maintained without being reduced even when the rechargeable lithium battery is cooled to low temperature.

According to the present invention, by using the separator having a micropore structure comprising polyethylene or polypropylene in combination of the pressure means comprising the polymer gel material, there can be efficiently produced a highly reliable rechargeable lithium battery excelling in safety at a reduced production cost.

Now, in the foregoing Examples 1 to 5, there were used lithium-cobalt oxide material, lithium-manganese oxide material, and lithium-nickel oxide material as the cathode active material. However, these oxide materials are not limitative. Besides these, other various metal oxide materials such as lithium-vanadium oxide material, lithium-iron oxide material, and the like are also effectively usable as the cathode active material in the present invention. Similarly, in the foregoing Examples 1 to 5, there was used only one kind of the electrolyte solution. However, this is not limitative. Other appropriate electrolyte solutions may be optionally used in the present invention.

Further, in the foregoing Examples 1, 2 and 5, three unit cells each comprising a pair of an anode and a cathode were integrated in series connection or parallel connection. However, these are not limitative. It should be understood that they may be modified as desired.

As above described, the present invention enables to attain the production of a highly reliable lithium battery which is low in internal resistance. The present invention is extremely effective in the production of a highly reliable prismatic rechargeable lithium battery which is low in internal resistance. Particularly, the present invention enables attaining the production of a highly reliable rechargeable lithium battery having a large electric capacity and which has a prolonged charging and discharging cycle life and an increased energy density. This rechargeable lithium battery according to the present invention exhibits performance such that the internal resistance is increased upon temperature rise and therefore, it is always maintained in a safe state even when the temperature thereof is raised.

TABLE 1

| | |
|---|---|
| charge-and-discharge efficiency | 1.6 |
| charging and discharging cycle life | 3.7 |
| average discharge voltage | 1.2 |

TABLE 2

| | |
|---|---|
| charge-and-discharge efficiency | 1.6 |
| charging and discharging cycle life | 4.5 |
| average discharge voltage | 1.2 |

TABLE 2

| | |
|---|---|
| charge-and-discharge efficiency | 1.6 |
| charging and discharging cycle life | 4.2 |
| average discharge voltage | 1.1 |

TABLE 4

| | |
|---|---|
| charge-and-discharge efficiency | 1.2 |
| charging and discharging cycle life | 1.8 |
| average discharge voltage | 1.1 |

TABLE 5

| | |
|---|---|
| charge-and-discharge efficiency | 1.7 |
| charging and discharging cycle | 3.8 |
| average discharge voltage | 1.3 |

TABLE 6

| | Internal Resistance at 25° C. |
|---|---|
| Example 1/Comparative Example 1 | 0.12 |
| Example 2/Comparative Example 1 | 0.10 |
| Example 3/Comparative Example 2 | 0.46 |
| Example 4/Comparative Example 3 | 0.73 |
| Example 5/Comparative Example 4 | 0.09 |

TABLE 7

| | 25° C. | 25° C. → 100° C. | 100° C. → 25° C. |
|---|---|---|---|
| Example 1 | 1 | 13 | 1.1 |
| Example 2 | 1 | 10 | 1.4 |
| Example 4 | 1 | 4.1 | 1.1 |
| Example 5 | 1 | 27 | 15 |

What is claimed is:

1. A rechargeable lithium battery comprising at least an anode, a separator, a cathode, and an electrolyte or electrolyte solution integrated in a battery housing, said rechargeable lithium battery being provided with a sheet comprising a polymer gel that presses said anode and cathode.

2. A rechargeable lithium battery according to claim 1, wherein the polymer gel is included in at least the separator so that it has a pressing function.

3. A rechargeable lithium battery according to claim 1, wherein the sheet contains a polymer gel capable of expanding or shrinking depending upon the concentration of a solvent.

4. A rechargeable lithium battery according to claim 1, wherein the polymer gel of the pressure means contains a material capable of being shrunk upon temperature rise to release the pressure between the anode and cathode.

5. A rechargeable lithium battery according to claim 1, wherein the polymer gel comprises a polymer with a molecular structure having side chains.

6. A rechargeable lithium battery according to claim 1, wherein the polymer gel is an ionic gel having at least one group capable of being dissociated into an ion.

7. A rechargeable lithium battery according to claim 1, wherein the sheet comprising the polymer gel comprises a support member for supporting the polymer gel.

8. A rechargeable lithium battery according to claim 7, wherein the support member comprises a nonwoven fabric.

9. A rechargeable lithium battery according to claim 1, wherein the polymer gel is in a powdery form.

10. A rechargeable lithium battery according to claim 7, wherein the polymer gel is arranged in or on the support member.

11. A rechargeable lithium battery according to claim 1, wherein the anode, separator and cathode are sequentially stacked into a stacked body and said stacked body is placed in a heat-shrinkable tubing.

12. A rechargeable lithium battery according to claim 11, wherein an end portion of the heat-shrinkable tubing on the side opposite to the other end portion of said heat-shrinkable tubing where power outputting terminals of the battery are situated is closed.

13. A rechargeable lithium battery having a stacked body comprising a plurality of cell units, each of said plurality of cell units comprising a cathode containing a cathode active material, a separator having an electrolyte solution retained therein, and an anode containing an anode active material sequentially stacked, characterized in that at least said stacked body is held between opposite sheets each comprising an expandable and shrinkable polymer gel.

14. A rechargeable lithium battery which comprises a stacked body comprising a cathode containing a cathode active material, a layer comprising an expandable and shrinkable polymer gel and having an electrolyte solution retained therein, and an anode containing an anode active material sequentially stacked, and a battery housing in which said stacked body is housed.

15. A rechargeable lithium battery comprising a stacked body housed in a battery housing, said stacked body comprising at least a cathode containing a cathode active material, a separator covered by a layer comprising an expandable and shrinkable polymer gel, and an anode containing an anode active material sequentially stacked.

16. A rechargeable lithium battery according to claim 15, wherein the stacked body has a cylindrical multiplet structure in which the stacked body is wound in multiple about an axis.

17. A rechargeable lithium battery comprising at least an anode, a separator, a cathode, and an electrolyte or electrolyte solution, integrated in a battery housing, said rechargeable lithium battery being provided with a polymer gel that presses said anode and cathode, said polymer gel being provided along a face of said anode or a face of said cathode, or both.

18. A rechargeable lithium battery according to claim 17, wherein the polymer gel is included in at least the separator so that it has a pressing function.

19. A rechargeable lithium battery according to claim 17, wherein the polymer gel is capable of expanding or shrinking depending upon the concentration of a solvent.

20. A rechargeable battery according to claim 17, wherein the polymer gel contains a material capable of being shrunk upon temperature rise to release the pressure between the anode and the cathode.

21. A rechargeable lithium battery according to claim 17, wherein the polymer gel comprises a polymer with a molecular structure having side chains.

22. A rechargeable lithium battery according to claim 17, wherein the polymer gel is an ionic gel having at least one group capable of being dissociated into an ion.

23. A rechargeable lithium battery according to claim 17, wherein the polymer gel comprises a sheet.

24. A rechargeable lithium battery according to claim 23, wherein the sheet comprises a support member for supporting the polymer gel.

25. A rechargeable lithium battery according to claim 24, wherein the support member comprises a non-woven fabric.

26. A rechargeable lithium battery according to claim 17, wherein the polymer gel is in a powdery form.

27. A rechargeable lithium battery according to claim 24, wherein the polymer gel is provided in or on the support member.

28. A rechargeable lithium battery according to claim 17, wherein the anode, separator, and cathode are sequentially stacked into a stacked body and said stacked body is placed in a heat-shrinkable tubing.

29. A rechargeable lithium battery according to claim 28, wherein an end portion of the heat-shrinkable tubing on the side opposite to the other end portion of said heat-shrinkable tubing where power outputting terminals of the battery are situated is closed.

* * * * *

UNITED STATES PATENT AND TRADEMARK OFFICE
CERTIFICATE OF CORRECTION

PATENT NO. : 5,853,914

DATED : December 29, 1998

INVENTOR(S) : SOICHIRO KAWAKAMI

It is certified that error appears in the above-identified patent and that said Letters Patent is hereby corrected as shown below:

COLUMN 1

Line 52, "a" should read --use of a--.

COLUMN 2

Line 55, "a" should read --an--.

COLUMN 4

Line 22, "result" should read --result,--.
   Line 59, "exhibit" should read --exhibits--.
   Line 64, "Accordingly" should read --Accordingly,--.

COLUMN 5

Line 20, "can" should read --can be--.

COLUMN 6

Line 13, "at" should read --of--.
   Line 40, "can" should read --can be--.

UNITED STATES PATENT AND TRADEMARK OFFICE
CERTIFICATE OF CORRECTION

PATENT NO. : 5,853,914

DATED : December 29, 1998

INVENTOR(S) : SOICHIRO KAWAKAMI

Page 2 of 5

It is certified that error appears in the above-identified patent and that said Letters Patent is hereby corrected as shown below:

<u>COLUMN 8</u>

```
Line 37, "to" should be deleted.
Line 61, "punching" should read --punched--.
```

<u>COLUMN 9</u>

```
Line 4, "a in" should read --in a--.
```

<u>COLUMN 11</u>

```
Line 22, "at" should read --of--.
```

<u>COLUMN 12</u>

```
Line 4, "deposited," should read --deposited--.
Line 21, "a" should read --an--.
Line 25, "deposited," should read --deposited--.
Line 39, "more" should read --more of--.
```

UNITED STATES PATENT AND TRADEMARK OFFICE
CERTIFICATE OF CORRECTION

PATENT NO. : 5,853,914

DATED : December 29, 1998

INVENTOR(S) : SOICHIRO KAWAKAMI

It is certified that error appears in the above-identified patent and that said Letters Patent is hereby corrected as shown below:

COLUMN 13

Line 12, "more" should read --more of--.

COLUMN 17

Line 8, "iside" should read --inside--.

COLUMN 19

Line 42, "get" should read --gel--.

COLUMN 20

Line 21, "voltage,." should read --voltage.--.

COLUMN 24

Line 7, "subjecting;" should read --subjecting it to--.

UNITED STATES PATENT AND TRADEMARK OFFICE
CERTIFICATE OF CORRECTION

PATENT NO. : 5,853,914

DATED : December 29, 1998

INVENTOR(S) : SOICHIRO KAWAKAMI

It is certified that error appears in the above-identified patent and that said Letters Patent is hereby corrected as shown below:

COLUMN 25

Line 51, "mal" should read --mol--.

COLUMN 26

Line 14, "calking" should read --caulking--.

COLUMN 27

Line 9, "comprises" should read --has--; and
   "has" should read --comprising--.
Line 40, "an" should be deleted.

COLUMN 30

Line 37, "for" should read --was obtained for--.
Line 64, "in" (2nd occurrence) should read --as--.

UNITED STATES PATENT AND TRADEMARK OFFICE
CERTIFICATE OF CORRECTION

PATENT NO. : 5,853,914

DATED : December 29, 1998

INVENTOR(S) : SOICHIRO KAWAKAMI

It is certified that error appears in the above-identified patent and that said Letters Patent is hereby corrected as shown below:

COLUMN 31

Line 4, "desired:" should read --desired.--.

COLUMN 32

Table 2, Line 9, "TABLE 2" (second occurrence) should read --TABLE 3--; and "1.6" should read --1.1--.

Signed and Sealed this

Eighteenth Day of April, 2000

Attest:

Q. TODD DICKINSON

*Attesting Officer*     *Director of Patents and Trademarks*